United States Patent
Liu et al.

(10) Patent No.: US 10,009,889 B2
(45) Date of Patent: Jun. 26, 2018

(54) METHOD AND APPARATUS FOR ALLOCATING CONTROL CHANNEL CANDIDATES

(71) Applicant: Huawei Technologies Co., Ltd., Shenzhen, Guangdong (CN)

(72) Inventors: Jianqin Liu, Beijing (CN); Jianghua Liu, Beijing (CN); Qiang Wu, Beijing (CN); Chi Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/623,188

(22) Filed: Jun. 14, 2017

(65) Prior Publication Data

US 2017/0289975 A1    Oct. 5, 2017

Related U.S. Application Data

(63) Continuation of application No. 14/668,506, filed on Mar. 25, 2015, now Pat. No. 9,699,773, which is a
(Continued)

(51) Int. Cl.
*H04W 72/04*    (2009.01)
*H04W 72/00*    (2009.01)
*H04L 5/00*    (2006.01)

(52) U.S. Cl.
CPC ......... *H04W 72/042* (2013.01); *H04L 5/0053* (2013.01); *H04W 72/04* (2013.01)

(58) Field of Classification Search
CPC .......................... H04W 72/0453; H04J 5/0055
(Continued)

(56) References Cited

U.S. PATENT DOCUMENTS

2009/0130985 A1*  5/2009  Lee .................... H04L 27/2608
                                                       455/67.11
2010/0265862 A1   10/2010 Choi et al.
(Continued)

FOREIGN PATENT DOCUMENTS

| CN | 102355732 A | 2/2012 |
|---|---|---|
| CN | 102404076 A | 4/2012 |
| EP | 2378703 A1 | 10/2011 |
| RU | 2484591 C2 | 6/2013 |
| WO | 2011023117 A1 | 3/2011 |
| WO | 2011128013 A1 | 10/2011 |
| WO | 2014044086 A1 | 3/2014 |

OTHER PUBLICATIONS

3GPP TSG_RAN WG1 Qingdao, China Aug. 13-17, 2012.*
(Continued)

*Primary Examiner* — Khaled Kassim
*Assistant Examiner* — Jason Harley

(57) ABSTRACT

A method and an apparatus for allocating control channel candidates is provided, which can allocate control channel candidates at different aggregation levels to K ePDCCH sets and reduce complexity of blind detection performed by a UE. The method includes: determining K sets for transmitting a control channel, where each set in the K sets includes at least one physical resource block pair; and allocating control channel candidates at each aggregation level to at least one set in the K sets according to at least one of aggregation levels supported by the control channel to be transmitted, the number of control channel candidates corresponding to each aggregation level, the K sets for transmitting the control channel, and types of the sets.

18 Claims, 2 Drawing Sheets

---

Determine K sets for transmitting a control channel, where each set in the K sets includes at least one physical resource block pair — 101

Allocate control channel candidates at each aggregation level to at least one set in the K sets according to at least one of aggregation levels supported by the control channel to be transmitted, the number of control channel candidates corresponding to each aggregation level, the K sets for transmitting the control channel, and types of the sets — 102

Related U.S. Application Data continuation of application No. PCT/CN2012/082217, filed on Sep. 27, 2012.

(58) Field of Classification Search
USPC .......................................... 370/329; 455/450
See application file for complete search history.

(56) References Cited

U.S. PATENT DOCUMENTS

| | | | |
|---|---|---|---|
| 2010/0279628 A1* | 11/2010 | Love | H04L 5/003 455/70 |
| 2011/0274005 A1* | 11/2011 | Lee | H04L 5/0007 370/252 |
| 2013/0107844 A1 | 5/2013 | Li et al. | |
| 2014/0140306 A1 | 5/2014 | Malladi et al. | |
| 2014/0301341 A1 | 10/2014 | Pan et al. | |
| 2015/0249528 A1 | 9/2015 | Chen et al. | |

OTHER PUBLICATIONS

Huawei, HiSilicon, "Aggregation levels of ePDCCH for localized and distributed transmission", 3GPP TSG RAN WG1 Meeting #69, May 21-25, 2012, 2 pages, R1-121964.

3rd Generation Partnership Project; Technical Specification Group Radio Access Network; Evolved Universal Terrestrial Radio Access (E-UTRA); Physical layer procedures (Release 11), 3GPP TS 36.213 V11.0.0 (Sep. 2012), 143 pages.

Panasonic, "ePDCCH search space design and configuration", 3GPP TSG RAN WG1 Meeting #69, May 21-25, 2012, 6 pages, R1-122202.

NTT Docomo, "Performance Evaluation of Search Space for ePDCCH", 3GPP TSG RAN WG1 Meeting #70, Aug. 13-17, 2012, 6 pages, R1-123552.

Huawei, HiSilicon, "Search space design for EPDCCH", 3GPP TSG RAN WG1 Meeting #70bis, Oct. 8-12, 2012, 8 pages, R1-124078.

Huawei, HiSilicon, "EPDCCH resource allocation", 3GPP TSG RAN WG1 Meeting #70bis, Oct. 8-12, 2012, 4 pages, R1-124162.

Catt, "Search space design for E-PDCCH," 3GPP TSG RAN WG1 Meeting #70, Aug. 13-17, 2012, total 5 pages, R1-123224.

Panasonic, "ePDCCH search space design", 3GPP TSG RAN WG1 Meeting #70, Aug. 13-17, 2012, 7 pages, R1-123289.

Renesas Mobile Europe Ltd, "Search space design for ePDCCH", 3GPP TSG-RAN WG1 Meeting #70, Aug. 13-17, 2012, 7 pages, R1-123586.

3rd Generation Partnership Project; Technical Specification Group Radio Access Network; Evolved Universal Terrestrial Radio Access (E-UTRA); Physical Channels and Modulation (Release 11), 3GPP TS 36.211 V11.0.0 (Sep. 2012), 106 pages.

* cited by examiner

METHOD AND APPARATUS FOR ALLOCATING CONTROL CHANNEL CANDIDATES

CROSS-REFERENCE TO RELATED APPLICATIONS

This application is a continuation of U.S. patent application Ser. No. 14/668,506, filed on Mar. 25, 2015, which is a continuation of International Application No. PCT/CN2012/082217, filed on Sep. 27, 2012. All of the afore-mentioned patent applications are hereby incorporated by reference in their entireties.

TECHNICAL FIELD

The present application relates to the communications field, and in particular, to a method and an apparatus for allocating control channel candidates.

BACKGROUND

In an LTE (long term evolution) Rel-8/9/10 communication system, a dynamic scheduling technology is used to improve performance of the system. In other words, an eNB (evolved Node Base, evolved base station) schedules and allocates resources according to channel conditions of each UE (user equipment), so that each scheduled UE performs transmission on an optimal channel of the UE. In downlink transmission, the eNB sends a PDSCH (physical downlink shared channel) and a corresponding PDCCH (physical downlink control channel) to each scheduled UE according to a dynamic scheduling result, where the PDSCH carries data sent by the eNB to the scheduled UE, and the PDCCH is mainly used to indicate a transport format of the corresponding PDSCH, including scheduling information such as resource allocation, transport block size, modulation and coding scheme, transport rank, and precoding matrix information.

In a subframe, each PDCCH used for downlink and uplink scheduling is multiplexed in N (N>1) CCEs numbered n=0, 1, ..., N−1 in a PDCCH region. Each PDCCH has 4 aggregation levels in total, namely, 1, 2, 4, and 8, which means, the PDCCH may be formed by aggregation of 1, 2, 4, or 8 consecutive CCEs. The aggregation level corresponding to each PDCCH is determined by the size of information blocks in the PDCCH and a channel of a UE corresponding to the PDCCH. Information in each PDCCH is mapped through the N CCEs to REs reserved for the PDCCH and is sent to a UE.

At a receiving end, the UE needs to blindly detect the N CCEs to obtain a PDCCH needed by the UE. The number of PDCCH candidates at each aggregation level is limited. A smaller number of PDCCH candidates indicate a smaller number of times of blind detections. For example, when aggregation level 1 is 8, there are only two PDCCH candidates, which means, CCEs 0 to 7 and CCEs 8 to 15 are detected. Although this PDCCH candidate allocation principle can reduce the number of times of blind detections, the number of times of blind detections needed at each aggregation level is still approximately in direct proportion to the number N of CCEs in the PDCCH region. To further reduce complexity of blind detections, the maximum number of PDCCH candidates to be blindly detected, namely, a search space, is limited at each aggregation level. The search space is classified into a common search space and a UE-specific search space. The difference between the two search spaces lies in that a start CCE of the common search space is in a fixed position, while a start CCE of the UE-specific search space is determined by a UE identity and a subframe number of a PDCCH, where the common search space and the UE-specific search space may overlap. After the number of PDCCH candidates included in the search space is set, the UE may start to perform a specified number of times of blind detections from the start CCE according to an aggregation level supported by the PDCCH candidates, thereby reducing the complexity of blind detections. For example, the number of CCEs in a PDCCH region is N=18, a start CCE of a UE-specific search space is 0, and the numbers of PDCCH candidates at aggregation levels l=1, 2, 4, and 8 are 6, 6, 2, and 2 respectively; then, when l=1, there are 6 PDCCH candidates, and there is one aggregated CCE in each PDCCH, and therefore, the UE needs to perform only 6 blind detections for 6 consecutive CCEs starting from the start CCE; when l=4, there are 2 PDCCH candidates, and there are 4 aggregated CCEs in each PDCCH, and therefore, the UE needs to perform only 2 blind detections for 2*4=8 consecutive CCEs starting from the start CCE.

In LTE Rel-11, an existing PDCCH is enhanced, in other words, a part of resources are divided from an original PDSCH region to transmit an enhanced PDCCH to form an ePDCCH (enhanced physical downlink control channel), so that capacity of the PDCCH and the number of simultaneously scheduled UEs are increased. The ePDCCH may be formed by aggregation of one or more eCCEs (enhanced control channel elements), and an aggregation level may be obtained according to CSI feedback information. According to whether the ePDCCH is transmitted in consecutive time-frequency resource positions, in other words, whether an eCCE is located in one physical resource block pair (corresponding to a localized transmission mode) or located in multiple distributed physical resource block pairs (corresponding to a distributed transmission mode), a transmission mode of the ePDCCH may be classified into a localized mode and a distributed mode.

Given a Normal subframe and a Normal CP or special subframe configurations 3, 4, and 8 (Normal CP), when the number of valid resource elements in each PRB Pair is less than a threshold, aggregation levels used by the localized transmission mode are 2, 4, 8, and 16, and aggregation levels used by the distributed transmission mode are 2, 4, 8, 16, and 32. In all other cases, aggregation levels used by the localized transmission mode are 1, 2, 4, and 8, and aggregation levels used by the distributed transmission mode are 1, 2, 4, 8, and 16. In a subframe, the UE may simultaneously detect control channel candidates of the localized transmission mode and distributed transmission mode. At the 3GPP RAN1#70, a conclusion on the design of a search space for an ePDCCH mainly includes: configuring K sets for a search space, where each set is made up of N PRB pairs, where N is equal to one of 1, 2, 4, 8, and 16, and the PRB pairs in each set may completely overlap or partially overlap. The maximum value of K is one of {2, 3, 4, 6}, where there are $K_L$ localized sets and $K_D$ distributed sets ($K_L$ and $K_D$ may be equal to 0), and the total number of times of blind detections is 32 or 48 and does not change according to the value of K.

When the UE performs blind detections for the search space of the K sets, the total number of times of blind detections is fixed. To reduce the complexity of blind detections, some limitations to the number of control channel candidates allocated in the K ePDCCH sets need to be made for each aggregation level; however, the prior art does not provide a method for allocating control channel candidates.

SUMMARY

Embodiments of the present application provide a method and an apparatus for allocating control channel candidates, which can allocate control channel candidates at different aggregation levels to K ePDCCH sets and reduce complexity of blind detections performed by a UE.

To achieve the foregoing objectives, the embodiments of the present application adopt the following technical solutions:

According to a first aspect, a method for allocating control channel candidates is provided and includes:

determining K sets for transmitting a control channel, where each set in the K sets includes at least one physical resource block pair, and K is a positive integer greater than 0; and allocating each control channel candidate to at least one set in the K sets according to at least one of aggregation levels supported by the control channel, the number of control channel candidates corresponding to each aggregation level, the K sets for transmitting the control channel, and types of the sets.

In a first possible implementation manner, the K sets for transmitting the control channel include a set of a localized transmission mode and a set of a distributed transmission mode, where the number of sets of the localized transmission mode is $K_L$, and the number of sets of the distributed transmission mode is $K_D$, $K_L+K_D=K$, and $K_L$ and $K_D$ are integers greater than or equal to 0; and the aggregation levels supported by the control channel include one or more of the following levels:

aggregation levels supported by the localized transmission mode, aggregation levels supported by the distributed transmission mode, and common aggregation levels supported by both the localized transmission mode and the distributed transmission mode.

In a second possible implementation manner, with reference to the first possible implementation manner of the first aspect, the allocating control channel candidates at each aggregation level to at least one set in the K sets according to the aggregation levels supported by the control channel to be transmitted, the number of control channel candidates corresponding to each aggregation level and determined according to a preset rule, the K sets for transmitting the control channel, and the types of the sets, includes:

when $K_L$ is a positive integer, allocating all control channel candidates at the aggregation levels supported by the localized transmission mode to at least one of the $K_L$ sets; or when $K_D$ is a positive integer, allocating all control channel candidates at the aggregation levels supported by the distributed transmission mode to at least one of the $K_D$ sets; or when both $K_L$ and $K_D$ are positive integers, allocating all control channel candidates at each aggregation level in the aggregation levels supported by both the localized transmission mode and the distributed transmission mode to at least one of the $K_D$ sets and at least one of the $K_L$ sets.

In a third possible implementation manner, both $K_L$ and $K_D$ are positive integers, all control channel candidates at each aggregation level in the aggregation levels supported by both the localized transmission mode and the distributed transmission mode are allocated to at least one of the $K_D$ sets and at least one of the $K_L$ sets, at least one half of all control channel candidates at each first aggregation level in the aggregation levels supported by both the localized transmission mode and the distributed transmission mode are allocated to at least one of the $K_L$ sets; and at least one half of all control channel candidates at each second aggregation level in the aggregation levels supported by both the localized transmission mode and the distributed transmission mode are allocated to at least one of the $K_D$ sets.

In a fourth possible implementation manner, the allocating all control channel candidates at an aggregation level supported by only the distributed transmission mode or the localized transmission mode to at least one set in the $K_D$ sets of the distributed transmission mode or in the $K_L$ sets of the localized transmission mode, includes:

determining, according to the number of sets used for the aggregation level in $K_D$ or $K_L$, the number of control channel candidates allocated to each set in the $K_D$ or $K_L$ sets, at the aggregation level; or determining, according to a ratio of the number of physical resource blocks of each set in sets used for the aggregation level in $K_D$ or $K_L$, the number of control channel candidates allocated to each set in the $K_D$ or $K_L$ sets, at the aggregation level.

In a fifth possible implementation manner, both $K_L$ and $K_D$ are positive integers, all control channel candidates at each aggregation level in the aggregation levels supported by both the localized transmission mode and the distributed transmission mode are allocated to at least one of the $K_D$ sets and at least one of the $K_L$ sets, according to a ratio between the numbers of sets used for the aggregation level in $K_D$ and $K_L$, the numbers of control channel candidates allocated to the $K_L$ and $K_D$ sets are determined, at each aggregation level; or according to a ratio between the total numbers of physical resource blocks in sets used for the aggregation level in $K_D$ and $K_L$, the numbers of control channel candidates allocated to the $K_L$ and $K_D$ sets are determined, at each aggregation level; or according to a ratio of the number of physical resource blocks of each set in sets used for the aggregation level in $K_D$ and $K_L$, the number of control channel candidates allocated to each set in the $K_L$ and $K_D$ sets is determined, at each aggregation level.

Optionally, at each aggregation level, when the number of control channel candidates configured for the $K_L$ (greater than 1) sets is greater than 1, the number of control channel candidates in each set is determined according to the number of physical resource blocks included in each set that can support the aggregation level in the $K_L$ sets or the number of sets that can support the aggregation level in the $K_L$ sets, or when the number of control channel candidates configured for the $K_D$ (greater than 1) sets is greater than 1, the number of control channel candidates in each set is determined according to the number of physical resource blocks included in each set that can support the aggregation level in the $K_D$ sets or the number of sets that can support the aggregation level in the $K_D$ sets.

Optionally, at each aggregation level supported by the control channel to be transmitted, the number of control channel candidates allocated to the $K_L$ sets of the localized transmission mode and the number of control channel candidates allocated to the $K_D$ sets of the distributed transmission mode are functions of at least one of the number of control channel candidates at the aggregation level, the number $K_L$ of sets of the localized transmission mode, and the number $K_D$ of sets of the distributed transmission mode.

Optionally, when the number of control channel candidates corresponding to the aggregation levels supported by both the localized transmission mode and the distributed transmission mode is an even number, the number of control channel candidates allocated to the $K_L$ sets of the localized transmission mode meets the following formula:

$$M^{(L)}/2 + \left\lfloor \frac{K_L}{K_L + K_D} \cdot M^{(L)}/2 \right\rfloor;$$

and the number of control channel candidates allocated to the $K_D$ sets of the distributed transmission mode meets the following formula:

$$M^{(L)}/2 - \left\lfloor \frac{K_L}{K_L + K_D} \cdot M^{(L)}/2 \right\rfloor;$$

when the number of control channel candidates corresponding to the lower aggregation levels is an odd number, the number of control channel candidates allocated to the $K_L$ sets of the localized transmission mode meets the following formula:

$$(M^{(L)} + 1)/2 + \left\lfloor \frac{K_L}{K_L + K_D} \cdot (M^{(L)} - 1)/2 \right\rfloor;$$

and the number of control channel candidates allocated to the $K_D$ sets of the distributed transmission mode meets the following formula:

$$(M^{(L)} - 1)/2 - \left\lfloor \frac{K_L}{K_L + K_D} \cdot (M^{(L)} - 1)/2 \right\rfloor;$$

and an allocation ratio of all candidates at aggregation levels where the number of control channel candidates is 2, is 1:1 between the $K_L$ sets of the localized transmission mode and the $K_D$ sets of the distributed transmission mode.

Optionally, at least one set in the determined K sets for transmitting the control channel is used to allocate control channel candidates at one or two aggregation levels.

A rule for determining aggregation levels that can be supported by the control channel to be transmitted includes:

when the total number of aggregation levels that can be supported by the control channel is N, obtaining, according to the number of valid physical resource elements included in each physical resource block pair, k (k<=N) aggregation levels in the N aggregation levels as aggregation levels of the control channel to be transmitted, or configuring, semi-statically through RRC signaling, k (k<=N) aggregation levels in the N aggregation levels as aggregation levels that can be supported by the control channel to be transmitted.

A form of semi-static configuration through RRC signaling is a bitmap.

If the number of aggregation levels of the control channel to be transmitted is N, the numbers of control channel candidates corresponding to any p (p<=4) aggregation levels in 4 aggregation levels (1, 2, 4, 8) in an original protocol are respectively configured for corresponding aggregation levels in the N aggregation levels of the control channel to be transmitted, and the numbers of control channel candidates corresponding to remaining (4-p) aggregation levels in the 4 aggregation levels (1, 2, 4, 8) in the original protocol are correspondingly configured for remaining N-p aggregation levels in the N aggregation levels of the control channel to be transmitted.

When the aggregation levels supported by the control channel to be transmitted include 32, and the number of available resource elements in each physical resource block pair except resource elements of other signals, such as a CRS, a DMRS, a CSI-RS, a PDCCH, is greater than or equal to 72, a user terminal does not detect control channel candidates at aggregation level 32; otherwise, the user terminal detects the control channel candidates at aggregation level 32;

or, when the aggregation levels supported by the control channel to be transmitted do not include 32, and the number of available resource elements in each physical resource block pair except resource elements of other signals, such as a CRS, a DMRS, a CSI-RS, a PDCCH, is less than 72, a user terminal detects control channel candidates at aggregation level 8.

When the control channel to be transmitted is transmitted with an extended cyclic prefix, and the supported aggregation levels include 16, and the number of available resource elements in each physical resource block pair except resource elements of other signals, such as a CRS, a DMRS, a CSI-RS, a PDCCH, is greater than or equal to 72, a user terminal does not detect control channel candidates at aggregation level 16; otherwise, the user terminal detects the control channel candidates at aggregation level 16;

or, when the control channel to be transmitted is transmitted with an extended cyclic prefix, and the supported aggregation levels do not include 16, and the number of available resource elements in each physical resource block pair except resource elements of other signals, such as a CRS, a DMRS, a CSI-RS, a PDCCH, is less than 72, a user terminal detects PDCCH candidates at aggregation level 8.

The $K_L$ and $K_D$ for transmitting the control channel are configured, and the number of physical resource block pairs included in each set is configured; or the $K_L$ and $K_D$ for transmitting the control channel are fixed, the number of physical resource block pairs included in each set is configured, and allocation of all control channel candidates at each aggregation level to the $K_L$ and $K_D$ sets is fixed.

In a second aspect, an apparatus for allocating control channel candidates is provided and includes:

a determining unit, configured to determine K sets for transmitting a control channel, where each set in the K sets includes at least one physical resource block pair, and K is a positive integer greater than 0; and an allocating unit, configured to allocate, according to at least one of aggregation levels supported by the control channel, the number of control channel candidates corresponding to each aggregation level, the K sets for transmitting the control channel, and types of the sets, each control channel candidate to at least one set in the K sets determined by the determining unit.

In a first possible implementation manner, the K sets for transmitting the control channel include a set of a localized transmission mode and a set of a distributed transmission mode, where the number of sets of the localized transmission mode is $K_L$, and the number of sets of the distributed transmission mode is $K_D$, $K_L+K_D=K$, and $K_L$ and $K_D$ are integers greater than or equal to 0; and the aggregation levels supported by the control channel include one or more of the following levels:

aggregation levels supported by the localized transmission mode, aggregation levels supported by the distributed transmission mode, and common aggregation levels supported by both the localized transmission mode and the distributed transmission mode.

The allocating unit is specifically configured to: when $K_L$ is a positive integer, allocate all control channel candidates at the aggregation levels supported by the localized transmission mode to at least one of the $K_L$ sets; or when $K_D$ is a positive integer, allocate all control channel candidates at the aggregation levels supported by the distributed transmission mode to at least one of the $K_D$ sets; or when both $K_L$ and $K_D$ are positive integers, allocate all control channel candidates at each aggregation level in the aggregation levels supported by both the localized transmission mode and the distributed transmission mode to at least one of the $K_D$ sets and at least one of the $K_L$ sets.

Optionally, the allocating unit being configured to allocate all control channel candidates at each aggregation level in the aggregation levels supported by both the localized transmission mode and the distributed transmission mode to at least one of the $K_D$ sets and at least one of the $K_L$ sets when both $K_L$ and $K_D$ are positive integers, includes:

allocating at least one half of all control channel candidates at each first aggregation level in the aggregation levels supported by both the localized transmission mode and the distributed transmission mode to at least one of the $K_L$ sets; and allocating at least one half of all control channel candidates at each second aggregation level in the aggregation levels supported by both the localized transmission mode and the distributed transmission mode to at least one of the $K_D$ sets.

Optionally, when the number of control channel candidates at the aggregation level is 2, remaining control channel candidates are not placed in any set corresponding to a transmission mode of a first control channel candidate.

Optionally, the allocating unit being configured to allocate all control channel candidates at an aggregation level supported by only the distributed transmission mode or the localized transmission mode to at least one set in the $K_D$ sets of the distributed transmission mode or in the $K_L$ sets of the localized transmission mode, includes:

determining, according to the number of sets used for the aggregation level in $K_D$ or $K_L$, the number of control channel candidates allocated to each set in the $K_D$ or $K_L$ sets, at the aggregation level; or determining, according to a ratio of the number of physical resource blocks of each set in sets used for the aggregation level in $K_D$ or $K_L$, the number of control channel candidates allocated to each set in the $K_D$ or $K_L$ sets, at the aggregation level.

Optionally, the allocating unit being configured to allocate all control channel candidates at each aggregation level in the aggregation levels supported by both the localized transmission mode and the distributed transmission mode to at least one of the $K_D$ sets and at least one of the $K_L$ sets when both $K_L$ and $K_D$ are positive integers, includes:

determining, according to a ratio between the numbers of sets used for the aggregation level in $K_D$ and $K_L$, the numbers of control channel candidates allocated to the $K_L$ and $K_D$ sets, at each aggregation level; or determining, according to a ratio between the total numbers of physical resource blocks in sets used for the aggregation level in $K_D$ and $K_L$, the numbers of control channel candidates allocated to the $K_L$ and $K_D$ sets, at each aggregation level; or determining, according to a ratio of the number of physical resource blocks of each set in sets used for the aggregation level in $K_D$ and $K_L$, the number of control channel candidates allocated to each set in the $K_L$ and $K_D$ sets, at each aggregation level.

Optionally, at each aggregation level, the numbers of control channel candidates allocated to the $K_L$ and $K_D$ sets are configured. The configuration is a higher-layer semi-static configuration.

At each aggregation level, when the number of control channel candidates configured for the $K_L$ (greater than 1) sets is greater than 1, the allocating unit is configured to determine the number of control channel candidates in each set according to the number of physical resource blocks included in each set that can support the aggregation level in the $K_L$ sets or the number of sets that can support the aggregation level in the $K_L$ sets, or when the number of control channel candidates configured for the $K_D$ (greater than 1) sets is greater than 1, the allocating unit is configured to determine the number of control channel candidates in each set according to the number of physical resource blocks included in each set that can support the aggregation level in the $K_D$ sets or the number of sets that can support the aggregation level in the $K_D$ sets.

At each aggregation level supported by the control channel to be transmitted, the number of control channel candidates allocated to the $K_L$ sets of the localized transmission mode and the number of control channel candidates allocated to the $K_D$ sets of the distributed transmission mode are functions of at least one of the number of control channel candidates at the aggregation level, the number $K_L$ of sets of the localized transmission mode, and the number $K_D$ of sets of the distributed transmission mode.

When the number of control channel candidates corresponding to the aggregation levels supported by both the localized transmission mode and the distributed transmission mode is an even number, the number of control channel candidates allocated to the $K_L$ sets of the localized transmission mode meets the following formula:

$$M^{(L)}/2 + \left\lfloor \frac{K_L}{K_L + K_D} \cdot M^{(L)}/2 \right\rfloor;$$

and the number of control channel candidates allocated to the $K_D$ sets of the distributed transmission mode meets the following formula:

$$M^{(L)}/2 - \left\lfloor \frac{K_L}{K_L + K_D} \cdot M^{(L)}/2 \right\rfloor;$$

when the number of control channel candidates corresponding to the lower aggregation levels is an odd number, the number of control channel candidates allocated to the $K_L$ sets of the localized transmission mode meets the following formula:

$$(M^{(L)} + 1)/2 + \left\lfloor \frac{K_L}{K_L + K_D} \cdot (M^{(L)} - 1)/2 \right\rfloor;$$

and the number of control channel candidates allocated to the $K_D$ sets of the distributed transmission mode meets the following formula:

$$(M^{(L)} - 1)/2 - \left\lfloor \frac{K_L}{K_L + K_D} \cdot (M^{(L)} - 1)/2 \right\rfloor;$$

and an allocation ratio of all candidates at aggregation levels where the number of control channel candidates is 2, is 1:1 between the $K_L$ sets of the localized transmission mode and the $K_D$ sets of the distributed transmission mode.

Optionally, the allocating unit is configured to determine that at least one set in the K sets for transmitting the control channel is used to allocate control channel candidates at one or two aggregation levels.

Optionally, a rule for determining aggregation levels that can be supported by the control channel to be transmitted includes:

when the total number of aggregation levels that can be supported by the control channel is N, obtaining, according to the number of valid physical resource elements included in each physical resource block pair, k (k<=N) aggregation levels in the N aggregation levels as aggregation levels of the control channel to be transmitted, or configuring, semi-statically through RRC signaling, k (k<=N) aggregation levels in the N aggregation levels as aggregation levels that can be supported by the control channel to be transmitted.

A form of semi-static configuration through RRC signaling is a bitmap.

If the number of aggregation levels of the control channel to be transmitted is N, the numbers of control channel candidates corresponding to any p (p<=4) aggregation levels in 4 aggregation levels (1, 2, 4, 8) in an original protocol are respectively configured for corresponding aggregation levels in the N aggregation levels of the control channel to be transmitted, and the numbers of control channel candidates corresponding to remaining (4-p) aggregation levels in the 4 aggregation levels (1, 2, 4, 8) in the original protocol are correspondingly configured for remaining N-p aggregation levels in the N aggregation levels of the control channel to be transmitted.

Optionally, the apparatus further includes a detecting unit, where: when the aggregation levels supported by the control channel to be transmitted include 32, and the number of available resource elements in each physical resource block pair except resource elements of other signals, such as a CRS, a DMRS, a CSI-RS, a PDCCH, is greater than or equal to 72, the detecting unit does not detect control channel candidates at aggregation level 32; otherwise, the detecting unit detects the control channel candidates at aggregation level 32; or, when the aggregation levels supported by the control channel to be transmitted do not include 32, and the number of available resource elements in each physical resource block pair except resource elements of other signals, such as a CRS, a DMRS, a CSI-RS, a PDCCH, is less than 72, the detecting unit detects control channel candidates at aggregation level 8.

Optionally, when the control channel to be transmitted is transmitted with an extended cyclic prefix, and the supported aggregation levels include 16, and the number of available resource elements in each physical resource block pair except resource elements of other signals, such as a CRS, a DMRS, a CSI-RS, a PDCCH, is greater than or equal to 72, the detecting unit does not detect control channel candidates at aggregation level 16; otherwise, the detecting unit detects the control channel candidates at aggregation level 16; or, when the control channel to be transmitted is transmitted with an extended cyclic prefix, and the supported aggregation levels do not include 16, and the number of available resource elements in each physical resource block pair except resource elements of other signals, such as a CRS, a DMRS, a CSI-RS, a PDCCH, is less than 72, the detecting unit detects PDCCH candidates at aggregation level 8.

Optionally, the $K_L$ and $K_D$ for transmitting the control channel are configured, and the number of physical resource block pairs included in each set is configured; or the $K_L$ and $K_D$ for transmitting the control channel are fixed, the number of physical resource block pairs included in each set is configured, and allocation of all control channel candidates at each aggregation level to the $K_L$ and $K_D$ sets is fixed.

In a third aspect, an apparatus for allocating control channel candidates is provided and includes: a receiver, a transmitter, a memory, and a processor that is connected to the receiver, the transmitter, and the memory, where the memory stores a group of program codes, and the processor invokes the program codes in the memory to perform the method provided by the first aspect.

In the method and apparatus for allocating control channel candidates according to the above technical solutions, K sets for transmitting a control channel are determined, and control channel candidates at each aggregation level are allocated to at least one set in the K sets according to at least one of aggregation levels supported by the control channel to be transmitted, the number of control channel candidates corresponding to each aggregation level, the K sets for transmitting the control channel, and types of the sets. Therefore, control channel candidates at different aggregation levels can be allocated to K ePDCCH sets, and a search space of a UE is defined, thereby reducing complexity of blind detection performed by the UE.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Figure 1:
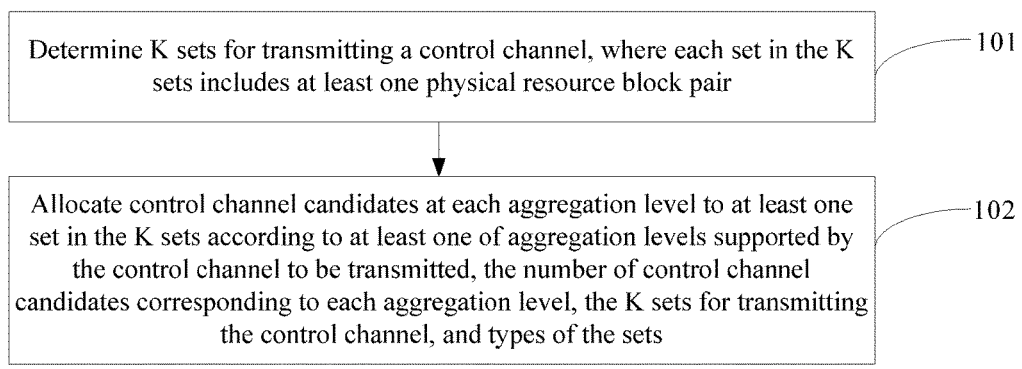
FIG. 1 is a schematic flowchart of a method for allocating control channel candidates according to an embodiment of the present application.

An embodiment of the present application provides a method for allocating control channel candidates (EPDCCH candidates). As shown in FIG. 1, the method includes the following:

101. Determine K sets for transmitting a control channel, where each set in the K sets includes at least one physical resource block pair, and K is a positive integer greater than 0.

There are two transmission modes for an ePDCCH, namely, localized transmission and distributed transmission. The localized transmission means that each eCCE aggregated into the ePDCCH is mapped to a PRB pair, and the distributed transmission means that each eCCE aggregated into the ePDCCH may be mapped to several non-consecutive PRB pairs in the frequency domain.

For a UE, ePDCCH resources used for the localized transmission and distributed transmission are configured by an eNB. This configuration may be dynamic or semi-static allocation. For ease of description, without loss of generality, in the embodiment of the present application, configurations of resources are described by using sets, and ePDCCH resources allocated by the eNB to the UE may be configured as K sets, where K is an integer greater than 0. Therefore, the set is also referred to as a resource set or an ePDCCH set. The K sets include two types: a set of a localized transmission mode and a set of a distributed transmission mode. The K sets for transmitting the control channel include $K_L$ sets of the localized transmission mode and $K_D$ sets of the distributed transmission mode, where $K_L + K_D = K$, and $K_L$ and $K_D$ are integers greater than or equal to 0.

Each set includes N (N>=1) PRB pairs. When ePDCCH resources are configured, according to values of $K_L$ and $K_D$, there may be the following cases: $K=K_L$, and $K_D=0$, which means, the eNB allocates only $K_L>=1$ sets of the localized transmission mode to the UE; $K=K_D$, and $K_L=0$, which means, the eNB allocates only $K_D>=1$ sets of the distributed transmission mode to the UE; $K=K_L+K_D$, where both $K_L$ and $K_D$ are not 0, which means, the eNB simultaneously allocates $K_L>=1$ sets of the localized transmission mode and $K_D>=1$ sets of the distributed transmission mode to the UE, where the number of PRB pairs in different sets may be the same or different, which is not limited by the embodiment of the present application.

When control channel candidates are allocated to the K sets (the control channel candidates may also be referred to as candidates), values of K, $K_L$, and $K_D$ need to be determined first. The $K_L$ and $K_D$ for transmitting the control channel are configured, and the number of physical resource block pairs included in each set is configured; or the $K_L$ and $K_D$ for transmitting the control channel are fixed, the number of physical resource block pairs included in each set is configured, and allocation of all control channel candidates at each aggregation level to the $K_L$ and $K_D$ sets is fixed.

Herein the configuration refers to parameters configured by the base station for the UE through higher-layer signaling, which means, values of the $K_L$ and $K_D$ and the number of physical resource block pairs included in each set may all be configured by the base station for the UE.

102. Allocate control channel candidates at each aggregation level to at least one set in the K sets according to at least one of aggregation levels supported by the control channel to be transmitted, the number of control channel candidates corresponding to each aggregation level, the K sets for transmitting the control channel, and types of the sets.

To facilitate blind detections performed by the UE, an ePDCCH search space needs to be defined in all the configured K ePDCCH sets. For example, ePDCCH sets configured for a UE include a set of the localized transmission mode and a set of the distributed transmission mode, and the number of PRB pairs in the configured set of the localized transmission mode is 8 and the number of PRB pairs in the configured set of the distributed transmission mode is 4, and 4 eCCEs may be transmitted in each PRB pair. Therefore, the set of the localized transmission mode and the set of the distributed transmission mode include 32 eCCEs and 16 eCCEs respectively, 48 eCCEs in total. The ePDCCH search space of the UE needs to be defined on the 48 eCCEs. Specifically, on the 48 eCCEs, eCCE positions of the control channel candidates at different aggregation levels are determined, in the other words, the number and eCCE positions of control channel candidates at different aggregation levels in the set of the localized transmission mode and the set of the distributed transmission mode are determined.

For the localized transmission mode and distributed transmission mode, generally when the base station can obtain accurate CSI feedback of a transmission channel of the UE, the base station can obtain a frequency scheduling gain and a beamforming gain by using the localized transmission mode. Therefore, a lower aggregation level may be used for an ePDCCH, for example, aggregation levels 1 and 2 can satisfy performance requirements. Otherwise, when the base station cannot obtain accurate or timely CSI feedback, the base station cannot obtain the frequency scheduling gain and beamforming gain. To ensure transmission performance of the ePDCCH, the distributed transmission mode needs to be used. Therefore, generally a higher aggregation level is used for transmission, for example, aggregation level 8, 16, or 32. Therefore, in the embodiment of the present application, in common aggregation levels supported by both the localized transmission mode and the distributed transmission mode, at least one half of candidates at a lower aggregation level are placed in the region of the set of the localized transmission mode, and at least one half of candidates at a higher aggregation level are placed in the region of the set of the distributed transmission mode.

After obtaining the value of K configured by the eNB for the UE, the UE may allocate the control channel candidates to at least one set in the K sets. The allocation method may include the following three cases: When the $K_L$ is a positive integer, the UE may allocate all control channel candidates at an aggregation level supported by only the localized transmission mode in the aggregation levels supported by the control channel to be transmitted to at least one set in the $K_L$ sets of the localized transmission mode; and when the $K_D$ is a positive integer, allocate all control channel candidates at an aggregation level supported by only the distributed transmission mode to at least one set in the $K_D$ sets of the distributed transmission mode. When both the $K_L$ and $K_D$ are positive integers, all control channel candidates at the aggregation levels supported by both the localized transmission mode and the distributed transmission mode are allocated to at least one of the $K_D$ sets of the distributed transmission mode and at least one of the $K_L$ sets of the localized transmission mode; and allocate all control channel candidates at the aggregation level supported by only the distributed transmission mode or the localized transmission mode to at least one of the $K_D$ sets of the distributed transmission mode or at least one of the $K_L$ sets of the localized transmission mode.

The allocating all control channel candidates at the aggregation levels supported by both the localized transmission mode and the distributed transmission mode to at least one of the $K_D$ sets of the distributed transmission mode and at least one of the $K_L$ sets of the localized transmission mode includes: allocating at least one half of all control channel candidates corresponding to a lower aggregation level in the aggregation levels supported by both the localized transmission mode and the distributed transmission mode to at least one of the $K_L$ sets of the localized transmission mode; and allocating at least one half of all control channel candidates corresponding to a higher aggregation level in the aggregation levels supported by both the localized transmission mode and the distributed transmission mode to at least one of the $K_D$ sets of the distributed transmission mode. As discussed at the 3GPP RAN1#70, for ePDCCH, given a Normal subframe and a Normal CP or special subframe configuration 3, 4 and 8 (Normal CP), when the number of valid resource elements in each PRB Pair is less than a threshold, the aggregation levels supported by the localized transmission mode are 2, 4, 8, and 16, and the aggregation levels supported by the distributed transmission mode are 2, 4, 8, 16, and 32. The aggregation levels supported by both the localized transmission mode and the distributed transmission mode are 2, 4, 8, and 16. In this case, the lower aggregation levels (namely, the first aggregation levels) are 2 and 4, and the higher aggregation levels (namely, the second aggregation levels) are 8 and 16. In all other cases, the aggregation levels used by the localized transmission mode are 1, 2, 4, and 8, and the aggregation levels used by the distributed transmission mode are 1, 2, 4, 8, and 16. The aggregation levels supported by both the localized transmission mode and the distributed transmission mode are 1, 2, 4, and 8. In this case, the lower aggregation levels are 1 and 2, and the higher aggregation levels are 4 and 8.

After completion of allocating at least one half of control channel candidates at each aggregation level in the aggregation levels supported by the control channel to be transmitted, remaining control channel candidates at each aggregation level are allocated to different sets according to a predefined sequence of control channel sets and a position of a start set at the aggregation level. The position of a start set at each aggregation level is related to the number of control channel candidates at the aggregation level and configuration of $K_L$ and $K_D$. For example, for a lower aggregation level, at least one half of control channel candidates at the aggregation level are allocated to $K_L$ sets of the localized transmission mode, and the position of the start set at the aggregation level may be set in a set of the localized transmission mode in $K_L$ sets of the localized transmission mode according to the number of control channel candidates at the aggregation level and $K_L$ and $K_D$.

Optionally, the UE may also allocate each control channel candidate to at least one set in the K sets according to the number of control channel candidates corresponding to each aggregation level and types of the sets. When the number of control channel candidates at the aggregation level is 2, remaining control channel candidates are allocated to all sets different from the type of the set to which the first control channel candidate is allocated. For example, if the numbers of all control channel candidates corresponding to the aggregation levels supported by both the localized transmission mode and the distributed transmission mode are 2, the first control channel candidate is first allocated to a set in the $K_L$ sets of the localized transmission mode, and the remaining one control channel candidate will be allocated to a set in the $K_D$ sets of the distributed transmission mode.

According to the above method, for a lower aggregation level in the aggregation levels supported by both the localized transmission mode and the distributed transmission mode, the UE may evenly allocate a half of the control channel candidates corresponding to the lower aggregation level to the $K_L$ sets of the localized transmission mode, and allocate the remaining half to different sets according to the predefined sequence of control channel sets and the position of a start set at the aggregation level.

In the existing protocol, the aggregation levels supported by both the localized transmission mode and the distributed transmission mode may be 1, 2, 4, and 8, or 2, 4, 8, and 16. Herein, assuming that the aggregation levels supported by both the localized transmission mode and the distributed transmission mode are 1, 2, 4, and 8, for lower aggregation levels 1 and 2, one half of control channel candidates corresponding to the aggregation levels 1 and 2 are first allocated to at least one set in the $K_L$ sets, and the remaining half are allocated to different sets according to the predefined sequence of control channel sets and the position of the start set at the aggregation levels.

Assuming that aggregation level 1 or 2 corresponds to 6 control channel candidates, the UE may allocate the first 3 control channel candidates in the 6 control channel candidates corresponding to aggregation level 1 or 2 to at least one set in the $K_L$ sets. In this embodiment, the allocating the first 3 control channel candidates to at least one set in the $K_L$ sets includes evenly allocating the 3 control channel candidates to the $K_L$ sets, which means, a control channel candidate is allocated to each set sequentially in an incremental cyclic manner. The remaining 3 control channel candidates are allocated to different sets according to the predefined sequence of control channel sets and the position of the start set at the aggregation level. In the embodiment of the present application, $K_L$ sets of the localized transmission mode are marked with 1, 2, . . . , and $K_L$, and $K_D$ sets of the distributed transmission mode are marked with 1, 2, . . . , and $K_D$. The allocating the remaining half of the control channel candidates at the lower aggregation level 1 or 2 to different sets according to the predefined sequence of control channel sets and the position of the start set at the aggregation level includes: allocating a control channel candidate to each set sequentially from the start set according to the sequence from $K_L$ sets 1, 2, . . . , and $K_L$ of the localized transmission mode to $K_D$ sets 1, 2, . . . , and $K_D$ of the distributed transmission mode, where the cyclic allocation is performed until the remaining half of the control channel candidates are allocated completely.

For K=4, $K_L$=2, and $K_D$=2, when the start ePDCCH set is set 1 of the localized transmission mode, the result of allocating 6 control channel candidates at aggregation level 1 or 2 to 4 ePDCCH sets is:

| Set 1 of the Localized Transmission Mode | Set 2 of the Localized Transmission Mode | Set 1 of the Distributed Transmission Mode | Set 2 of the Distributed Transmission Mode |
|---|---|---|---|
| 3 | 2 | 1 | 0 |

The first 3 control channel candidates are allocated to sets 1 and 2 of the localized transmission mode, where 2 control channel candidates are in set 1 of the localized transmission mode, and 1 control channel candidate is in set 2 of the localized transmission mode. The last 3 control channel candidates are sequentially allocated to sets 1 and 2 of the localized transmission mode and set 1 of the distributed transmission mode from set 1 of the localized transmission mode. Therefore, the final result of allocating the 6 control channel candidates to the 4 ePDCCH sets is: 3 control channel candidates are in set 1 of the localized transmission mode, 2 control channel candidates are in set 2 of the localized transmission mode, and 1 control channel candidate is in set 1 of the distributed transmission mode.

Likewise, for K=4, $K_L$=1, and $K_D$=3, when the start ePDCCH set is set 1 of the localized transmission mode, the result of allocating 6 candidates at aggregation level 1 or 2 to 4 ePDCCH sets is:

| Set 1 of the Localized Transmission Mode | Set 1 of the Distributed Transmission Mode | Set 2 of the Distributed Transmission Mode | Set 3 of the Distributed Transmission Mode |
|---|---|---|---|
| 4 | 1 | 1 | 0 |

For K=4, $K_L$=3, and $K_D$=1, when the start ePDCCH set is set 3 of the localized transmission mode, the result of allocating 6 candidates at aggregation level 1 or 2 to 4 ePDCCH sets is:

| Set 1 of the Localized Transmission Mode | Set 2 of the Localized Transmission Mode | Set 3 of the Localized Transmission Mode | Set 1 of the Distributed Transmission Mode |
|---|---|---|---|
| 1 | 2 | 2 | 1 |

For K=4, $K_L$=4, and $K_D$=0, when the start ePDCCH set is set 1 of the localized transmission mode, the result of allocating 6 candidates at aggregation level 1 or 2 to 4 ePDCCH sets is:

| Set 1 of the Localized Transmission Mode | Set 2 of the Localized Transmission Mode | Set 3 of the Localized Transmission Mode | Set 4 of the Localized Transmission Mode |
|---|---|---|---|
| 2 | 2 | 1 | 1 |

For K=4, $K_L$=0, and $K_D$=4, when the start ePDCCH set is set 1 of the distributed transmission mode, the result of allocating 6 candidates at aggregation level 1 or 2 to 4 ePDCCH sets is:

| Set 1 of the Distributed Transmission Mode | Set 2 of the Distributed Transmission Mode | Set 3 of the Distributed Transmission Mode | Set 4 of the Distributed Transmission Mode |
|---|---|---|---|
| 2 | 2 | 1 | 1 |

For K=2, $K_L$=1, and $K_D$=1, assuming that the start ePDCCH set is set 1 of the localized transmission mode, the result of allocating 6 candidates at aggregation level 1 or 2 to 2 ePDCCH sets is:

| Set 1 of the Localized Transmission Mode | Set 1 of the Distributed Transmission Mode |
|---|---|
| 5 | 1 |

For K=2, $K_L$=2, and $K_D$=0, assuming that the start ePDCCH set is set 2 of the localized transmission mode, the result of allocating 6 candidates at aggregation level 1 or 2 to 2 ePDCCH sets is:

| Set 1 of the Localized Transmission Mode | Set 2 of the Localized Transmission Mode |
|---|---|
| 3 | 3 |

For K=2, $K_L$=0, and $K_D$=2, assuming that the start ePDCCH set is set 1 of the distributed transmission mode, the result of allocating 6 candidates at aggregation level 1 or 2 to 2 ePDCCH sets is:

| Set 1 of the Distributed Transmission Mode | Set 2 of the Distributed Transmission Mode |
|---|---|
| 3 | 3 |

In the above method, after the UE allocates at least one half of the control channel candidates corresponding to a lower aggregation level to at least one set in $K_L$ sets of the localized transmission mode, the UE allocates a control channel candidate to each set sequentially from the start set according to the sequence from $K_L$ sets 1, 2, . . . , and $K_L$ of the localized transmission mode to $K_D$ sets 1, 2, . . . , and $K_D$ of the distributed transmission mode, where the cyclic allocation is performed until the remaining control channel candidates are allocated completely. Optionally, the allocating the remaining control channel candidates to different sets according to the predefined sequence of control channel sets and the position of a start set at the aggregation level may also include: allocating a control channel candidate in the sets of the localized transmission mode and the sets of the distributed transmission mode from the start set in a head/tail alternation manner according to the sequence of $K_L$ sets 1, 2, . . . , and $K_L$ of the localized transmission mode and $K_D$ sets 1, 2, . . . , and $K_D$ of the distributed transmission mode, until the remaining half of the control channel candidates are allocated completely.

For K=4, $K_L$=1, and $K_D$=3, when the start ePDCCH set is set 1 of the localized transmission mode, the result of allocating 6 candidates at aggregation level 1 or 2 to 4 ePDCCH sets is:

| Set 1 of the Localized Transmission Mode | Set 1 of the Distributed Transmission Mode | Set 2 of the Distributed Transmission Mode | Set 3 of the Distributed Transmission Mode |
|---|---|---|---|
| 2 | 1 | 1 | 2 |

For K=4, $K_L$=1, and $K_D$=3, when the start ePDCCH set is set 2 of the localized transmission mode, the result of allocating 6 candidates at aggregation level 1 or 2 to 4 ePDCCH sets is:

| Set 1 of the Localized Transmission Mode | Set 1 of the Distributed Transmission Mode | Set 2 of the Distributed Transmission Mode | Set 3 of the Distributed Transmission Mode |
|---|---|---|---|
| 1 | 2 | 1 | 2 |

For a higher aggregation level in the aggregation levels supported by both the localized transmission mode and the distributed transmission mode, the UE may allocate at least one half of the control channel candidates corresponding to the higher aggregation level to at least one set in the $K_D$ sets of the distributed transmission mode, and allocate the remaining control channel candidates to different sets according to the predefined sequence of control channel sets and the position of a start set at the aggregation level. In the embodiment of the present application, the allocating at least one half of the control channel candidates corresponding to the higher aggregation level to at least one set in the $K_D$ sets of the distributed transmission mode includes: allocating a control channel candidate to each set in the $K_D$ sets of the distributed transmission mode sequentially according to the sequence 1, 2, . . . , and $K_D$, where the cyclic allocation is performed until at least one half of the control channel candidates are allocated completely. The allocating the remaining control channel candidates to different sets according to the predefined sequence of control channel sets and the position of a start set at the aggregation level includes: allocating one of the remaining control channel candidates to each set sequentially from the start set according to the reverse sequence from $K_L$ sets 1, 2, . . . , and $K_L$ of the localized transmission mode to $K_D$ sets 1, 2, . . . , and $K_D$ of the distributed transmission mode, where the cyclic allocation is performed until the remaining half of the control channel candidates are allocated completely. Preferably, when the number of control channel candidates at the aggregation level is 2, remaining control channel candidates are allocated to all sets different from the type of the set to which the first control channel candidate is allocated. In other words, when the number of candidates at the aggregation level is 2, two control channel candidates are respectively allocated to a set in a region of the distributed transmission mode and a set in a region of localized transmission mode.

Herein, still assuming that the aggregation levels supported by both the localized transmission mode and the distributed transmission mode are 1, 2, 4, and 8, for the higher aggregation levels 4 and 8, a half of the control channel candidates corresponding to aggregation levels 4 and 8 are first allocated to at least one set in the $K_D$ sets of the distributed transmission mode. In this embodiment, the first control channel candidate is allocated to one of the $K_D$ sets, for example, a control channel candidate is allocated to each set sequentially in an incremental cyclic manner. The remaining half may be allocated to all sets different from the type of the set to which the first control channel candidate is allocated, namely, to a set in the $K_L$ sets of the localized transmission mode.

For K=4, $K_L$=2, and $K_D$=2, when two control channel candidates are respectively allocated to a set in the region of the distributed transmission mode and a set in the region of the localized transmission mode, the result of allocating 2 control channel candidates at aggregation level 4 or 8 to 4 ePDCCH sets is:

| Set 1 of the Localized Transmission Mode | Set 1 of the Distributed Transmission Mode | Set 2 of the Distributed Transmission Mode | Set 3 of the Distributed Transmission Mode |
|---|---|---|---|
| 1 | 2 | 1 | 2 |

For K=4, $K_L$=2, and $K_D$=2, when the start set is set 1 of the distributed transmission mode, the result of allocating 2 control channel candidates at aggregation level 4 or 8 to 4 ePDCCH sets is:

| Set 1 of the Localized Transmission Mode | Set 2 of the Localized Transmission Mode | Set 1 of the Distributed Transmission Mode | Set 2 of the Distributed Transmission Mode |
|---|---|---|---|
| 0 | 1 | 1 | 0 |

| Set 1 of the Localized Transmission Mode | Set 2 of the Localized Transmission Mode | Set 1 of the Distributed Transmission Mode | Set 2 of the Distributed Transmission Mode |
|---|---|---|---|
| 1 | 0 | 1 | 0 |

For K=2, $K_L$=1, and $K_D$=1, the result of allocating 2 control channel candidates at aggregation level 4 or 8 to 2 ePDCCH sets is:

| Set 1 of the Localized Transmission Mode | Set 1 of the Distributed Transmission Mode |
|---|---|
| 1 | 1 |

In the above method, after the UE allocates at least one half of the control channel candidates corresponding to a higher aggregation level to at least one set in $K_D$ sets of the distributed transmission mode, the UE allocates a control channel candidate to each set sequentially from the start set according to the sequence from $K_L$ sets 1, 2, . . . , and $K_L$ of the localized transmission mode to $K_D$ sets 1, 2, . . . , and $K_D$ of the distributed transmission mode, where the cyclic allocation is performed until the remaining control channel candidates are allocated completely. Optionally, the allocating the remaining control channel candidates to different sets according to the predefined sequence of control channel sets and the position of a start set at the aggregation level may also include: allocating a control channel candidate in the sets of the localized transmission mode and the sets of the distributed transmission mode from the start set in a head/tail alternation manner according to the sequence of $K_L$ sets 1, 2, . . . , and $K_L$ of the localized transmission mode and $K_D$ sets 1, 2, . . . , and $K_D$ of the distributed transmission mode, until the remaining half of the control channel candidates are allocated completely.

For K=4, $K_L$=2, and $K_D$=2, when two control channel candidates are respectively allocated to a set in the region of the distributed transmission mode and a set in the region of the localized transmission mode, the result of allocating 2 control channel candidates at aggregation level 4 or 8 to 4 ePDCCH sets is:

| Set 1 of the Localized Transmission Mode | Set 2 of the Localized Transmission Mode | Set 1 of the Distributed Transmission Mode | Set 2 of the Distributed Transmission Mode |
|---|---|---|---|
| 1 | 0 | 0 | 1 |

After obtaining the value of K configured by the eNB for the UE, the UE may allocate the control channel candidates to at least one set in the K sets. The allocation method may include 3 cases. In the third case, the allocating all control channel candidates at the aggregation levels supported by both the localized transmission mode and the distributed transmission mode to at least one set in the $K_D$ sets of the distributed transmission mode and at least one set in the $K_L$ sets of the localized transmission mode when both the $K_L$ and $K_D$ are positive integers, may also include:

determining, according to a ratio between the numbers of sets used for the aggregation levels in $K_D$ and $K_L$, the number of control channel candidates allocated to the $K_L$ and $K_D$ sets, at each aggregation level; or determining, according to a ratio between the total numbers of physical resource blocks in sets used for the aggregation levels in $K_D$ and $K_L$, the number of control channel candidates allocated to the $K_L$ and $K_D$ sets, at each aggregation level; or determining, according to a ratio of the number of physical resource blocks of each set in sets used for the aggregation levels in $K_D$ and $K_L$, the number of control channel candidates allocated to each set in the $K_L$ and $K_D$ sets, at each aggregation level.

After allocating all control channel candidates at the aggregation levels supported by both the distributed transmission mode and the localized transmission mode to at least one set in the $K_D$ sets of the distributed transmission mode and at least one set in the $K_L$ sets of the localized transmission mode, all control channel candidates at the aggregation level supported by only the distributed transmission mode or the localized transmission mode are allocated to at least one set in the $K_D$ sets of the distributed transmission mode or in the $K_L$ sets of the localized transmission mode, which includes: determining, according to the number of sets used for the aggregation level in $K_D$ or $K_L$, the number of control channel candidates allocated to each set in the $K_L$ or $K_D$ sets, at the aggregation level; or determining, according to a ratio of the number of physical resource blocks of each set in sets used for the aggregation level in $K_D$ or $K_L$, the number of control channel candidates allocated to each set in the $K_L$ or $K_D$ sets, at the aggregation level. For example, aggregation levels supported by the control channel to be transmitted may be 1, 2, 4, 8, and 16, and may also be 2, 4, 8, 16, and 32, where an aggregation level supported by only the distributed transmission mode is 16 or 32, and the UE may allocate all control channel candidates at aggregation level 16 or 32 to at least one set in the $K_D$ sets of the distributed transmission mode. Generally, the UE may allocate all control channel candidates at aggregation level 16 or 32 to one set in the $K_D$ sets of the distributed transmission mode. Optionally, the UE also determines, according to the number of sets used for the aggregation level 16 or 32 in $K_D$, the number of control channel candidates allocated to each set, at the aggregation level 16 or 32, for example, when the number of sets used for the aggregation level 16 or 32 is 2, and the number of control channel candidates is also 2, allocation is performed sequentially in a manner of placing one candidate in each set. Otherwise, allocation is performed by using the following methods:

Method 1: Firstly, assuming that the number of control channel candidates corresponding to the aggregation level is $M^{(L)}$, and the number of sets is K, perform allocation, according to the number $\lfloor M^{(L)}/K \rfloor$, for each set of the sets supporting the aggregation level, then place one of the remaining $M^{(L)} - \lfloor M^{(L)}/K \rfloor$ candidates cyclically to each set sequentially until all candidates are completely allocated. "$\lfloor$ $\rfloor$" means rounding up.

Method 2: According to a ratio of the number of physical resource blocks of each set supporting the aggregation level to the total number of physical resource blocks in all sets that support the aggregation level, first perform the following allocation in the set of the highest or lowest ratio: $\lfloor M^{(L)} \cdot (N_i/N_{total}) \rfloor$, where $N_i$ is the number of physical resource blocks in set i, and $N_{total}$ is the total number of physical resource blocks in all the sets. Secondly, according to this method, place the remaining $M^{(L)} - \lfloor M^{(L)} \cdot (N_i/N_{total}) \rfloor$ candidates in a set of a next higher or next lower ratio in a recursive manner until all candidates are allocated completely.

Method 3: Mark each set supporting the aggregation level L with s1, s2, s3, ..., and sT. Firstly, allocate ci control channel candidates to set si according to the following formula, where the number ci may be indicated by:

$$c_i = \left\lfloor \frac{C_L \times N_i}{\sum_{j=1}^{T} N_j} \right\rfloor.$$

Place the remaining $$R = C_L - \sum_{j=1}^{T} c_i$$

control channel candidates in R sets according to a preset rule. Herein $C_L$ is the number of control channel candidates corresponding to the aggregation level L.

The preset rule may be: sorting the R sets according to the number of physical resource block pairs included in each set, marking the sorted R sets with s1, s2, s3, ..., and sR, where assuming that the number of physical resource block pairs included in the set si is Ni, the sorted sets satisfy Ni≥Nj and i<=j, and placing one control channel candidate in each set of the R sets sequentially according to the sequence of s1, s2, ..., and sR.

In the above method, the UE allocates all control channel candidates at the aggregation levels supported by both the localized transmission mode and the distributed transmission mode in the aggregation levels supported by the control channel to be transmitted to at least one set in the $K_D$ sets of the distributed transmission mode and at least one set in the $K_L$ sets of the localized transmission mode; and allocates all control channel candidates at the aggregation level supported by only the distributed transmission mode or localized transmission mode to at least one set in the $K_D$ sets of the distributed transmission mode or $K_L$ sets of the localized transmission mode. Optionally, at each aggregation level supported by the control channel to be transmitted, the numbers of control channel candidates allocated to the $K_L$ sets of the localized transmission mode and the $K_D$ sets of the distributed transmission mode may be configured, and may also be obtained by calculation, which means, the allocation is a function of at least one of the number of control channel candidates at the aggregation level, the number $K_L$ of sets of the localized transmission mode, and the number $K_D$ of sets of the distributed transmission mode.

Optionally, the UE may receive the number of control channel candidates at each aggregation level, which is higher-layer semi-statically configured by RRC signaling, in the $K_L$ sets of the localized transmission mode and the $K_D$ sets of the distributed transmission mode. Preferably, when the number of available resource elements included in each PRB pair is greater than or equal to a threshold (such as 104), one configuration, as shown in the following tables, is semi-statically configured by RRC signaling for the UE:

| Aggregation Level | Set of the Localized Transmission Mode | Set of the Distributed Transmission Mode |
|---|---|---|
| 1 | 3 | 1 |
| 2 | 4 | 2 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 3 | 1 |
| 2 | 3 | 3 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 3 | 1 |
| 2 | 5 | 1 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 3 | 1 |
| 2 | 6 | 0 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 2 | 2 |
| 2 | 3 | 3 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 2 | 2 |
| 2 | 4 | 2 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 2 | 2 |
| 2 | 5 | 1 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 2 | 2 |
| 2 | 6 | 0 |
| 4 | 1 | 1 |
| 8 | 1 | 1 |
| 16 | 0 | 2 |

| Aggregation Level | Set of the Localized Transmission Mode | Set of the Distributed Transmission Mode |
|---|---|---|
| 1 | 4 | 1 |
| 2 | 4 | 2 |
| 4 | 1 | 1 |
| 8 | 1 | 1 |
| 16 | 0 | 1 |

| Aggregation Level | Set of the Localized Transmission Mode | Set of the Distributed Transmission Mode |
|---|---|---|
| 1 | 4 | 1 |
| 2 | 3 | 3 |
| 4 | 1 | 1 |
| 8 | 1 | 1 |
| 16 | 0 | 1 |

| Aggregation Level | Set of the Localized Transmission Mode | Set of the Distributed Transmission Mode |
|---|---|---|
| 1 | 4 | 1 |
| 2 | 5 | 1 |
| 4 | 1 | 1 |
| 8 | 1 | 1 |
| 16 | 0 | 1 |

| Aggregation Level | Set of the Localized Transmission Mode | Set of the Distributed Transmission Mode |
|---|---|---|
| 1 | 4 | 1 |
| 2 | 6 | 0 |
| 4 | 1 | 1 |
| 8 | 1 | 1 |
| 16 | 0 | 1 |

| Aggregation Level | Set of the Localized Transmission Mode | Set of the Distributed Transmission Mode |
|---|---|---|
| 1 | 4 | 1 |
| 2 | 6 | 0 |
| 4 | 1 | 1 |

| Aggregation Level | Set of the Localized Transmission Mode | Set of the Distributed Transmission Mode |
| --- | --- | --- |
| 8 | 1 | 1 |
| 16 | 0 | 1 |

| Aggregation Level | Set of the Localized Transmission Mode | Set of the Distributed Transmission Mode |
| --- | --- | --- |
| 1 | 3 | 2 |
| 2 | 3 | 3 |
| 4 | 1 | 1 |
| 8 | 1 | 1 |
| 16 | 0 | 1 |

| Aggregation Level | Set of the Localized Transmission Mode | Set of the Distributed Transmission Mode |
| --- | --- | --- |
| 1 | 3 | 2 |
| 2 | 4 | 2 |
| 4 | 1 | 1 |
| 8 | 1 | 1 |
| 16 | 0 | 1 |

| Aggregation Level | Set of the Localized Transmission Mode | Set of the Distributed Transmission Mode |
| --- | --- | --- |
| 1 | 3 | 2 |
| 2 | 5 | 1 |
| 4 | 1 | 1 |
| 8 | 1 | 1 |
| 16 | 0 | 1 |

| Aggregation Level | Set of the Localized Transmission Mode | Set of the Distributed Transmission Mode |
| --- | --- | --- |
| 1 | 3 | 2 |
| 2 | 6 | 0 |
| 4 | 1 | 1 |
| 8 | 1 | 1 |
| 16 | 0 | 1 |

| Aggregation Level | Set of the Localized Transmission Mode | Set of the Distributed Transmission Mode |
| --- | --- | --- |
| 1 | 5 | 0 |
| 2 | 6 | 0 |
| 4 | 1 | 1 |
| 8 | 1 | 1 |
| 16 | 0 | 1 |

| Aggregation Level | Set of the Localized Transmission Mode | Set of the Distributed Transmission Mode |
| --- | --- | --- |
| 1 | 4 | 0 |
| 2 | 6 | 0 |
| 4 | 1 | 1 |
| 8 | 1 | 1 |
| 16 | 0 | 2 |

When the number of available resource elements included in each PRB pair is less than a threshold (such as 104), one configuration, as shown in the following tables, semi-statically configured by RRC signaling for the terminal:

| Aggregation Level | Set of the Localized Transmission Mode | Set of the Distributed Transmission Mode |
| --- | --- | --- |
| 2 | 3 | 1 |
| 4 | 4 | 2 |
| 8 | 1 | 1 |
| 16 | 1 | 1 |
| 32 | 0 | 2 |

| Aggregation Level | Set of the Localized Transmission Mode | Set of the Distributed Transmission Mode |
| --- | --- | --- |
| 2 | 3 | 1 |
| 4 | 3 | 3 |
| 8 | 1 | 1 |
| 16 | 1 | 1 |
| 32 | 0 | 2 |

| Aggregation Level | Set of the Localized Transmission Mode | Set of the Distributed Transmission Mode |
| --- | --- | --- |
| 2 | 3 | 1 |
| 4 | 5 | 1 |
| 8 | 1 | 1 |
| 16 | 1 | 1 |
| 32 | 0 | 2 |

| Aggregation Level | Set of the Localized Transmission Mode | Set of the Distributed Transmission Mode |
| --- | --- | --- |
| 2 | 3 | 1 |
| 4 | 6 | 0 |
| 8 | 1 | 1 |
| 16 | 1 | 1 |
| 32 | 0 | 2 |

| Aggregation Level | Set of the Localized Transmission Mode | Set of the Distributed Transmission Mode |
| --- | --- | --- |
| 2 | 2 | 2 |
| 4 | 3 | 3 |
| 8 | 1 | 1 |
| 16 | 1 | 1 |
| 32 | 0 | 2 |

| Aggregation Level | Set of the Localized Transmission Mode | Set of the Distributed Transmission Mode |
| --- | --- | --- |
| 2 | 2 | 2 |
| 4 | 4 | 2 |
| 8 | 1 | 1 |
| 16 | 1 | 1 |
| 32 | 0 | 2 |

| Aggregation Level | Set of the Localized Transmission Mode | Set of the Distributed Transmission Mode |
|---|---|---|
| 2 | 2 | 2 |
| 4 | 5 | 1 |
| 8 | 1 | 1 |
| 16 | 1 | 1 |
| 32 | 0 | 2 |

| Aggregation Level | Set of the Localized Transmission Mode | Set of the Distributed Transmission Mode |
|---|---|---|
| 2 | 2 | 2 |
| 4 | 6 | 0 |
| 8 | 1 | 1 |
| 16 | 1 | 1 |
| 32 | 0 | 2 |

| Aggregation Level | Set of the Localized Transmission Mode | Set of the Distributed Transmission Mode |
|---|---|---|
| 2 | 4 | 1 |
| 4 | 4 | 2 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 4 | 1 |
| 4 | 3 | 3 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 4 | 1 |
| 4 | 5 | 1 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 4 | 1 |
| 4 | 6 | 0 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 4 | 1 |
| 4 | 6 | 0 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 3 | 2 |
| 4 | 3 | 3 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 3 | 2 |
| 4 | 4 | 2 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 3 | 2 |
| 4 | 5 | 1 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 3 | 2 |
| 4 | 6 | 0 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 5 | 0 |
| 4 | 6 | 0 |
| 8 | 1 | 1 |
| 16 | 1 | 1 |
| 32 | 0 | 1 |

| Aggregation Level | Set of the Localized Transmission Mode | Set of the Distributed Transmission Mode |
|---|---|---|
| 2 | 4 | 0 |
| 4 | 6 | 0 |
| 8 | 1 | 1 |
| 16 | 1 | 1 |
| 32 | 0 | 2 |

Optionally, according to the allocation shown in the above tables, the UE may perform proportional allocation of the candidates between different sets according to the number of PRB pairs included in each set of a set type, for example, when the number of control channel candidates allocated to the $K_L=2$ sets of the localized transmission mode is 3, and the numbers of PRB Pairs included in two sets are 2 and 4 respectively, the 3 control channel candidates are respectively allocated to each set according to the ratio of the number of included PRB Pairs, namely, 1:2. Of course, when the number of control channel candidates is 4, and allocation cannot be performed according to the ratio 1:2, allocation may be performed according to the ratio ceil(4/(1+2))−1=1:ceil(4*2/(1+2))=3. Ceil means rounding up.

Optionally, the UE may also obtain, by calculation, the number of control channel candidates allocated to the $K_L$ sets of the localized transmission mode and the $K_D$ sets of the distributed transmission mode. Preferably, for a lower aggregation level supported by the control channel to be transmitted, when the number of control channel candidates corresponding to the lower aggregation level is an even number, the number of control channel candidates allocated to the $K_L$ sets of the localized transmission mode meets the following formula:

$$M^{(L)}/2 + \left\lfloor \frac{K_L}{K_L + K_D} \cdot M^{(L)}/2 \right\rfloor;$$

and the number of control channel candidates allocated to the $K_D$ sets of the localized transmission mode meets the following formula:

$$M^{(L)}/2 - \left\lfloor \frac{K_L}{K_L + K_D} \cdot M^{(L)}/2 \right\rfloor;$$

when the number of control channel candidates corresponding to the lower aggregation level is an odd number, the number of control channel candidates allocated to the $K_L$ sets of the localized transmission mode meets the following formula:

$$(M^{(L)} + 1)/2 + \left\lfloor \frac{K_L}{K_L + K_D} \cdot (M^{(L)} - 1)/2 \right\rfloor;$$

and the number of control channel candidates allocated to the $K_D$ sets of the localized transmission mode meets the following formula:

$$(M^{(L)} - 1)/2 - \left\lfloor \frac{K_L}{K_L + K_D} \cdot (M^{(L)} - 1)/2 \right\rfloor;$$

and an allocation ratio of all candidates at aggregation levels supported by the control channel to be transmitted, except the lower aggregation level, is 1:1 between the $K_L$ sets of the localized transmission mode and the $K_D$ sets of the distributed transmission mode. When the aggregation levels supported by the control channel to be transmitted are 1, 2, 4, 8, and 16, the lower aggregation levels are 1 and 2; when the aggregation levels supported by the control channel to be transmitted are 2, 4, 8, 16, and 32, the lower aggregation levels are 2 and 4.

Based on the higher-layer semi-statically configured or the calculated number of control channel candidates at each aggregation level in the $K_L$ sets of the localized transmission mode and $K_D$ sets of the distributed transmission mode, for each aggregation level, when the number of control channel candidates configured for the $K_L$ sets of the localized transmission mode is greater than 1, the number of control channel candidates in each set is determined according to the number of physical resource blocks included in each set of the localized transmission mode; or when the number of control channel candidates configured for the $K_D$ sets of the distributed transmission mode is greater than 1, the number of control channel candidates in each set is determined according to the number of physical resource blocks included in each set of the distributed transmission mode.

Optionally, the UE may perform proportional allocation of the above candidates between different sets according to the number of PRB pairs included in each set of a set type, for example, when the number of control channel candidates allocated to the $K_L=2$ sets of the localized transmission mode is 3, and the numbers of PRB Pairs included in two sets are 2 and 4 respectively, the 3 control channel candidates are respectively allocated to each set according to the ratio of the number of included PRB Pairs, namely, 1:2. Of course, when the number of control channel candidates is 4, and allocation cannot be performed according to the ratio 1:2, allocation may be performed according to the ratio ceil(4/(1+2))−1=1:ceil(4*2/(1+2))=3. Ceil means rounding up.

Further, there may be a binding relationship between the number of PRB Pairs specific to the aggregation level and control channel candidates. For example, when the aggregation level is 4 (the corresponding number of control channel candidates is 2), and the number of sets is 4, 2 sets may be first selected from the 4 sets and then allocation and binding of the control channel candidates are performed according to the number of PRB pairs included in the 2 sets. Herein the sets may be selected sequentially according to the ascending order of PRB Pair numbers.

Optionally, the allocating the control channel candidates at each aggregation level to at least one set in the K sets according to aggregation levels supported by the control channel to be transmitted, the number of control channel candidates corresponding to each aggregation level, the K sets for transmitting the control channel, and types of the sets, includes: allocating all control channel candidates at one or two aggregation levels to at least one set in the K sets.

Optionally, the UE may bind aggregation levels with the K sets, which means, all candidates at each aggregation level are allocated to at least one specific set, and all candidates at each aggregation level in a transmission mode correspond to one or more ePDCCH sets in the region of the set of the transmission mode. When 4 control channel candidates of the localized transmission mode and 2 control channel candidates of the distributed transmission mode at aggregation levels 1 and 2 are allocated, the UE may allocate the corresponding 4 control channel candidates of the localized transmission mode to the first set of the localized transmission mode in the $K_L$ sets of the localized transmission mode, and allocate the corresponding 2 control channel candidates of the distributed transmission mode to the first set of the distributed transmission mode in the $K_D$ sets of the distributed transmission mode. When 1 candidate of the localized transmission mode and 1 candidate of the distributed transmission mode at aggregation levels 4 and 8 are allocated, the UE may allocate the corresponding 1 candidate of the localized transmission mode to the second set in the $K_L$ sets of the localized transmission mode, and allocate the corresponding 1 candidate of the distributed transmission mode to the second set in the $K_D$ sets of the distributed transmission mode. All control channel candidates at aggregation levels 16 and 32 are allocated to the third specific set in the region of the distributed transmission mode, where the number of PRB Pairs included in the specific set is at least 4 or 8.

Binding between the aggregation levels and the K sets may reduce reservations of PUCCH ACK/NCK resource positions, because the number of reserved PUCCH ACK/NCK resources in each set may be determined according to the bound aggregation levels. For example, a set includes 8 PRB pairs, and 32 eCCEs are specially used for placing candidates at aggregation level 16 or/and 32; therefore, when ACK/NACK resources are reserved, only two ACK/NACK resources, instead of 32 resources, need to be reserved.

Control channel candidates at each aggregation level are placed in each set according to a sequence and a reverse sequence alternately. For example, for candidates at aggregation level 1, one candidate is placed in each PRB Pair according to the ascending order of the PRB Pair numbers, and for candidates at aggregation level 2, one candidate is placed in each PRB Pair according to the descending order of the PRB Pair numbers. Likewise, by analogy, all control channel candidates at aggregation levels 4, 8, and 16 may be placed in the corresponding sets.

The $K_L$ and $K_D$ for transmitting the control channel are configured, and the number of physical resource block pairs included in each set is configured; or the $K_L$ and $K_D$ for transmitting the control channel are fixed, the number of physical resource block pairs included in each set is configured, and allocation of all control channel candidates at each aggregation level to the $K_L$ and $K_D$ sets is fixed.

Optionally, a rule for determining the number of control channel candidates corresponding to the aggregation levels that are supported by the control channel to be transmitted is as follows:

When only the sets of the localized transmission mode exist, namely, $K_L>0$ and $K_D=0$, there may be the following two cases for the number of control channel candidates corresponding to each aggregation level.

1. Given an extended cyclic prefix and a normal cyclic prefix, and normal subframe/special subframe configurations 3, 4, and 8, when $n_{EPDCCH}$ the number of available resource elements in each PRB Pair, is greater than or equal to 104 ($n_{EPDCCH} \geq 104$), the number of control channel candidates corresponding to each aggregation level is shown in the following table:

| | Search Space $S_k^{(L)}$ | | |
|---|---|---|---|
| Type | Aggregation Level L | Size [in eCCEs] | Number $M^{(L)}$ of ePDCCH Candidates |
| UE-Specific | 1 | 6 | 6 |
| | 2 | 12 | 6 |
| | 4 | 8 | 2 |
| | 8 | 16 | 2 |

2. Given a normal cyclic prefix and normal subframe/special subframe configurations 3, 4, and 8, when $n_{EPDCCH}$, the number of available resource elements in each PRB Pair, is less than 104 ($n_{EPDCCH}<104$), the number of control channel candidates corresponding to each aggregation level is shown in the following table:

| | Search Space $S_k^{(L)}$ | | |
|---|---|---|---|
| Type | Aggregation Level L | Size [in eCCEs] | Number $M^{(L)}$ of ePDCCH Candidates |
| UE-Specific | 2 | 12 | 6 |
| | 4 | 24 | 6 |
| | 8 | 16 | 2 |
| | 16 | 32 | 2 |

When only the sets of the distributed transmission mode exist, namely, $K_L=0$ and $K_D>0$, there may be the following cases for the number of control channel candidates corresponding to each aggregation level:

Given an extended cyclic prefix and a normal cyclic prefix, and normal subframe/special subframe configurations 3, 4, and 8, when $n_{EPDCCH}$, the number of available resource elements in each PRB Pair, is greater than or equal to 104 ($n_{EPDCCH} \geq 104$), the number of control channel candidates corresponding to each aggregation level is shown in the following tables:

| | Search Space $S_k^{(L)}$ | | |
|---|---|---|---|
| Type | Aggregation Level L | Size [in eCCEs] | Number $M^{(L)}$ of ePDCCH Candidates |
| UE-Specific | 1 | 4 | 4 |
| | 2 | 12 | 6 |
| | 4 | 8 | 2 |
| | 8 | 16 | 2 |

| | Search Space $S_k^{(L)}$ | | |
|---|---|---|---|
| Type | Aggregation Level L | Size [in eCCEs] | Number $M^{(L)}$ of ePDCCH Candidates |
| | 16 | 32 | 2 |

| | Search Space $S_k^{(L)}$ | | |
|---|---|---|---|
| Type | Aggregation Level L | Size [in eCCEs] | Number $M^{(L)}$ of ePDCCH Candidates |
| UE-Specific | 1 | 5 | 5 |
| | 2 | 12 | 6 |
| | 4 | 8 | 2 |
| | 8 | 16 | 2 |
| | 16 | 16 | 1 |

Given a normal cyclic prefix and normal subframe/special subframe configurations 3, 4, and 8, when $n_{EPDCCH}$ the number of available resource elements in each PRB Pair, is less than 104 ($n_{EPDCCH}<104$), the UE blindly detects EPDCCH candidates.

| | Search Space $S_k^{(L)}$ | | |
|---|---|---|---|
| Type | Aggregation Level L | Size [in eCCEs] | Number $M^{(L)}$ of ePDCCH Candidates |
| UE-Specific | 2 | 8 | 4 |
| | 4 | 24 | 6 |
| | 8 | 16 | 2 |

-continued

| Type | Search Space $S_k^{(L)}$ Aggregation Level L | Size [in eCCEs] | Number $M^{(L)}$ of ePDCCH Candidates |
|---|---|---|---|
| | 16 | 32 | 2 |
| | 32 | 64 | 2 |

| Type | Search Space $S_k^{(L)}$ Aggregation Level L | Size [in eCCEs] | Number $M^{(L)}$ of ePDCCH Candidates |
|---|---|---|---|
| UE-Specific | 2 | 10 | 5 |
| | 4 | 24 | 6 |
| | 8 | 16 | 2 |
| | 16 | 32 | 2 |
| | 32 | 32 | 1 |

The allocation solution considers that control information corresponding to main transmission modes in Rel-11 is usually large and that one purpose of introducing the ePDCCH is to enhance coverage. Therefore, after a new higher aggregation level is introduced for the ePDCCH, the numbers of candidates at other aggregation levels remain unchanged, and 1 or 2 candidates at aggregation level 1 are transferred to the added higher aggregation level.

When the sets of the localized transmission mode and the sets of the distributed transmission mode exist, namely, $K_L>0$ and $K_D>0$, there may be the following cases for the number of control channel candidates corresponding to each aggregation level.

Given an extended cyclic prefix and a normal cyclic prefix, and normal subframe/special subframe configurations 3, 4, and 8, when $n_{EPDCCH}$ the number of available resource elements in each PRB Pair, is greater than or equal to 104 ($n_{EPDCCH} \geq 104$), the number of control channel candidates corresponding to each aggregation level is shown in the following table:

| Type | Search Space $S_k^{(L)}$ Aggregation Level L | Size [in eCCEs] | Number $M^{(L)}$ of ePDCCH Candidates |
|---|---|---|---|
| UE-Specific | 1 | 6 | 6L |
| | 2 | 12 | 6L |
| | 4 | 1 | 1L |
| | 8 | 16 | 2(1L + 1D) |
| | 16 | 16 | 1D |

Given a normal cyclic prefix and normal subframe/special subframe configurations 3, 4, and 8, when $n_{EPDCCH}$, the number of available resource elements in each PRB Pair, is less than 104 ($n_{EPDCCH} < 104$), the number of control channel candidates corresponding to each aggregation level is shown in the following table:

| Type | Search Space $S_k^{(L)}$ Aggregation Level L | Size [in eCCEs] | Number $M^{(L)}$ of ePDCCH Candidates |
|---|---|---|---|
| UE-Specific | 2 | 12 | 6L |
| | 4 | 24 | 6L |
| | 8 | 16 | 1L |
| | 16 | 32 | 2(1L + 1D) |
| | 32 | 32 | 1L |

Optionally, the maximum value of the number K of sets of all UEs may be fixed to one of 2, 3, 4, and 6, and the number of PRB pairs included in each set changes according to scenarios. For example, when the number of users in a cell or the number of multiplexed users in each set increases, the number of PRB pairs included in each set also increases. In this case, the UE may cyclically map the corresponding number of control channel candidates corresponding to each aggregation level sequentially according to the sequence of the K sets until the corresponding number of control channel candidates corresponding to each aggregation level are allocated completely.

This solution may simplify the allocation of all control channel candidates at each aggregation level among K sets (especially in a case where both a set of the localized transmission mode and a set of the distributed transmission mode exist). For example, when the maximum number K of sets is 2, one is a set of the localized transmission mode, and the other is a set of the distributed transmission mode. In this case, all candidates at each aggregation level may be allocated to the two sets respectively according to one half of the number.

Figure 2:
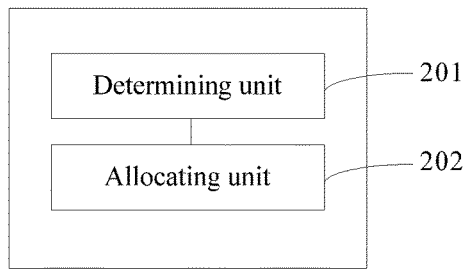
FIG. 2 is a structural block diagram of an apparatus for allocating control channel candidates according to an embodiment of the present application.

An embodiment of the present application further provides an apparatus for allocating control channel candidates. As shown in FIG. 2, the apparatus includes a determining unit 201 and an allocating unit 202.

The determining unit 201 is configured to determine K sets for transmitting a control channel, where each set in the K sets includes at least one physical resource block pair, and K is a positive integer greater than 0; and the allocating unit 202 is configured to allocate, according to at least one of aggregation levels supported by the control channel, the number of control channel candidates corresponding to each aggregation level, the K sets for transmitting the control channel, and types of the sets, each control channel candidate to at least one set in the K sets determined by the determining unit 201.

The K sets for transmitting the control channel include a set of a localized transmission mode and a set of a distributed transmission mode, where the number of sets of the localized transmission mode is $K_L$, and the number of sets of the distributed transmission mode is $K_D$, where $K_L+K_D=K$, and $K_L$ and $K_D$ are integers greater than or equal to 0; and the aggregation levels supported by the control channel include one or more of the following levels: aggregation levels supported by the localized transmission mode, aggregation levels supported by the distributed transmission mode, and common aggregation levels supported by both the localized transmission mode and the distributed transmission mode.

Optionally, the allocating unit 202 is specifically configured to: when $K_L$ is a positive integer, allocate all control channel candidates at the aggregation levels supported by the localized transmission mode to at least one of the $K_L$ sets; or when $K_D$ is a positive integer, allocate all control channel candidates at the aggregation levels supported by the distributed transmission mode to at least one of the $K_D$ sets; or when both $K_L$ and $K_D$ are positive integers, allocate all control channel candidates at each aggregation level in the aggregation levels supported by both the localized transmission mode and the distributed transmission mode to at least one of the $K_D$ sets and at least one of the $K_L$ sets.

The allocating unit 202 being configured to allocate all control channel candidates at each aggregation level in the aggregation levels supported by both the localized transmission mode and the distributed transmission mode to at least one of the $K_D$ sets and at least one of the $K_L$ sets when both $K_L$ and $K_D$ are positive integers, includes: allocating at least one half of all control channel candidates at each first aggregation level in the aggregation levels supported by both the localized transmission mode and the distributed transmission mode to at least one of the $K_L$ sets; and allocating at least one half of all control channel candidates at each second aggregation level in the aggregation levels supported by both the localized transmission mode and the distributed transmission mode to at least one of the $K_D$ sets.

Herein, when the aggregation levels supported by both the localized transmission mode and the distributed transmission mode are 1, 2, 4, and 8, the first aggregation levels are 1 and 2, and the second aggregation levels are 4 and 8; and when the aggregation levels supported by both the localized transmission mode and the distributed transmission mode are 2, 4, 8, and 16, the first aggregation levels are 2 and 4, and the second aggregation levels are 8 and 16. Remaining control channel candidates at each aggregation level are allocated to different sets according to a predefined sequence of control channel sets and/or a position of a start set at the aggregation level. The position of a start set at each aggregation level is related to the number of control channel candidates at the aggregation level and configuration of $K_L$ and $K_D$.

Optionally, when the number of control channel candidates at the aggregation level is 2, remaining control channel candidates are not placed in any set corresponding to a transmission mode of a first control channel candidate.

The allocating unit 202 being configured to allocate all control channel candidates at an aggregation level supported by only the distributed transmission mode or the localized transmission mode to at least one set in the $K_D$ sets of the distributed transmission mode or in the $K_L$ sets of the localized transmission mode, includes: determining, according to the number of sets used for the aggregation level in $K_D$ or $K_L$, the number of control channel candidates allocated to each set in the $K_D$ or $K_L$ sets, at the aggregation level; or determining, according to a ratio of the number of physical resource blocks of each set in sets used for the aggregation level in $K_D$ or $K_L$, the number of control channel candidates allocated to each set in the $K_D$ or $K_L$ sets, at the aggregation level.

The allocating unit 202 being configured to allocate all control channel candidates at each aggregation level in the aggregation levels supported by both the localized transmission mode and the distributed transmission mode to at least one of the $K_D$ sets and at least one of the $K_L$ sets when both $K_L$ and $K_D$ are positive integers, includes: determining, according to a ratio between the numbers of sets used for the aggregation level in $K_D$ and $K_L$, the numbers of control channel candidates allocated to the $K_L$ and $K_D$ sets, at each aggregation level; or determining, according to a ratio between the total numbers of physical resource blocks in sets used for the aggregation level in $K_D$ and $K_L$, the numbers of control channel candidates allocated to the $K_L$ and $K_D$ sets, at each aggregation level; or determining, according to a ratio of the number of physical resource blocks of each set in sets used for the aggregation level in $K_D$ and $K_L$, the number of control channel candidates allocated to each set in the $K_L$ and $K_D$ sets, at each aggregation level.

At each aggregation level, the numbers of control channel candidates allocated to the $K_L$ and $K_D$ sets are configured. The configuration is a higher-layer semi-static configuration.

At each aggregation level, when the number of control channel candidates configured for the $K_L$ (greater than 1) sets is greater than 1, the allocating unit 202 is configured to determine the number of control channel candidates in each set according to the number of physical resource blocks included in each set that can support the aggregation level in the $K_L$ sets or the number of sets that can support the aggregation level in the $K_L$ sets, or when the number of control channel candidates configured for the $K_D$ (greater than 1) sets is greater than 1, the allocating unit 202 is configured to determine the number of control channel candidates in each set according to the number of physical resource blocks included in each set that can support the aggregation level in the $K_D$ sets or the number of sets that can support the aggregation level in the $K_D$ sets.

At each aggregation level supported by the control channel to be transmitted, the number of control channel candidates allocated to the $K_L$ sets of the localized transmission mode and the number of control channel candidates allocated to the $K_D$ sets of the distributed transmission mode are functions of at least one of the number of control channel candidates at the aggregation level, the number $K_L$ of sets of the localized transmission mode, and the number $K_D$ of sets of the distributed transmission mode.

When the number of control channel candidates corresponding to the aggregation levels supported by both the localized transmission mode and the distributed transmission mode is an even number, the number of control channel candidates allocated to the $K_L$ sets of the localized transmission mode meets the following formula:

$$M^{(L)}/2 + \left\lfloor \frac{K_L}{K_L + K_D} \cdot M^{(L)}/2 \right\rfloor;$$

and the number of control channel candidates allocated to the $K_D$ sets of the distributed transmission mode meets the following formula:

$$M^{(L)}/2 - \left\lfloor \frac{K_L}{K_L + K_D} \cdot M^{(L)}/2 \right\rfloor.$$

When the number of control channel candidates corresponding to the lower aggregation levels is an odd number, the number of control channel candidates allocated to the $K_L$ sets of the localized transmission mode meets the following formula:

$$(M^{(L)} + 1)/2 + \left\lfloor \frac{K_L}{K_L + K_D} \cdot (M^{(L)} - 1)/2 \right\rfloor;$$

and the number of control channel candidates allocated to the $K_D$ sets of the distributed transmission mode meets the following formula:

$$(M^{(L)} - 1)/2 - \left\lfloor \frac{K_L}{K_L + K_D} \cdot (M^{(L)} - 1)/2 \right\rfloor;.$$

An allocation ratio of all candidates at aggregation levels where the number of control channel candidates is 2, is 1:1 between the $K_L$ sets of the localized transmission mode and the $K_D$ sets of the distributed transmission mode.

The allocating unit 202 is configured to determine that at least one set in the K sets for transmitting the control channel is used to allocate control channel candidates at one or two aggregation levels.

A rule for determining aggregation levels that can be supported by the control channel to be transmitted includes:
when the total number of aggregation levels that can be supported by the control channel is N, obtaining, according to the number of valid physical resource elements included in each physical resource block pair, k (k<=N) aggregation levels in the N aggregation levels as aggregation levels of the control channel to be transmitted, or configuring, semi-statically through RRC signaling, k (k<=N) aggregation levels in the N aggregation levels as aggregation levels that can be supported by the control channel to be transmitted.

A form of semi-static configuration through RRC signaling is a bitmap.

If the number of aggregation levels of the control channel to be transmitted is N, the numbers of control channel candidates corresponding to any p (p<=4) aggregation levels in 4 aggregation levels (1, 2, 4, 8) in an original protocol are respectively configured for corresponding aggregation levels in the N aggregation levels of the control channel to be transmitted, and the numbers of control channel candidates corresponding to remaining (4-p) aggregation levels in the 4 aggregation levels (1, 2, 4, 8) in the original protocol are correspondingly configured for remaining N-p aggregation levels in the N aggregation levels of the control channel to be transmitted.

Optionally, the apparatus includes a detecting unit. When the aggregation levels supported by the control channel to be transmitted include 32, and the number of available resource elements in each physical resource block pair except resource elements of other signals, such as a CRS, a DMRS, a CSI-RS, a PDCCH, is greater than or equal to 72, the detecting unit does not detect control channel candidates at aggregation level 32; otherwise, the detecting unit detects the control channel candidates at aggregation level 32; or, when the aggregation levels supported by the control channel to be transmitted do not include 32, and the number of available resource elements in each physical resource block pair except resource elements of other signals, such as a CRS, a DMRS, a CSI-RS, a PDCCH, is less than 72, the detecting unit detects control channel candidates at aggregation level 8.

When the control channel to be transmitted is transmitted with an extended cyclic prefix, and the supported aggregation levels include 16, and the number of available resource elements in each physical resource block pair except resource elements of other signals, such as a CRS, a DMRS, a CSI-RS, a PDCCH, is greater than or equal to 72, the detecting unit does not detect control channel candidates at aggregation level 16; otherwise, the detecting unit detects the control channel candidates at aggregation level 16; or, when the control channel to be transmitted is transmitted with an extended cyclic prefix, and the supported aggregation levels do not include 16, and the number of available resource elements in each physical resource block pair except resource elements of other signals, such as a CRS, a DMRS, a CSI-RS, a PDCCH, is less than 72, the detecting unit detects PDCCH candidates at aggregation level 8.

The $K_L$ and $K_D$ for transmitting the control channel are configured, and the number of physical resource block pairs included in each set is configured; or the $K_L$ and $K_D$ for transmitting the control channel are fixed, the number of physical resource block pairs included in each set is configured, and allocation of all control channel candidates at each aggregation level to the $K_L$ and $K_D$ sets is fixed.

Herein the configuration refers to parameters configured by the base station for the UE through higher-layer signaling, which means, values of the $K_L$ and $K_D$ and the number of physical resource block pairs included in each set may all be configured by the base station for the UE.

Figure 3:
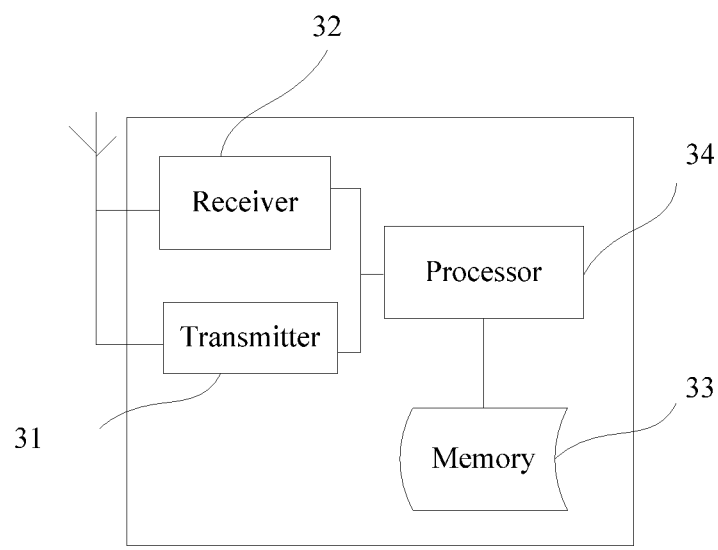
FIG. 3 is a structural block diagram of another apparatus for allocating control channel candidates according to an embodiment of the present application.

An embodiment of the present application further provides an apparatus for allocating control channel candidates. As shown in FIG. 3, the apparatus includes a receiver 32, a transmitter 31, a memory 33, and a processor 34 that is connected to the receiver 31, the transmitter 32, and the memory 33, where the receiver may be configured to receive higher-layer signaling sent by a base station. The memory stores a group of program codes, and the processor invokes the program codes in the memory to perform operations.

The processor 34 is configured to determine K sets for transmitting a control channel, where each set in the K sets includes at least one physical resource block pair, and K is a positive integer greater than 0; the processor 34 is configured to allocate, according to at least one of aggregation levels supported by the control channel, the number of control channel candidates corresponding to each aggregation level, the K sets for transmitting the control channel, and types of the sets, each control channel candidate to at least one set in the K sets determined by the processor 34.

The K sets for transmitting the control channel include a set of a localized transmission mode and a set of a distributed transmission mode, where the number of sets of the localized transmission mode is $K_L$, and the number of sets of the distributed transmission mode is $K_D$, where $K_L + K_D = K$, and $K_L$ and $K_D$ are integers greater than or equal to 0; and the aggregation levels supported by the control channel include one or more of the following levels: aggregation levels supported by the localized transmission mode, aggregation levels supported by the distributed transmission mode, and common aggregation levels supported by both the localized transmission mode and the distributed transmission mode.

Optionally, the processor 34 is specifically configured to: when $K_L$ is a positive integer, allocate all control channel candidates at the aggregation levels supported by the localized transmission mode to at least one of the $K_L$ sets; or when $K_D$ is a positive integer, allocate all control channel candidates at the aggregation levels supported by the distributed transmission mode to at least one of the $K_D$ sets; or when both $K_L$ and $K_D$ are positive integers, allocate all control channel candidates at each aggregation level in the aggregation levels supported by both the localized transmission mode and the distributed transmission mode to at least one of the $K_D$ sets and at least one of the $K_L$ sets.

The processor 34 being configured to allocate all control channel candidates at each aggregation level in the aggregation levels supported by both the localized transmission mode and the distributed transmission mode to at least one of the $K_D$ sets and at least one of the $K_L$ sets when both $K_L$ and $K_D$ are positive integers, includes: allocating at least one half of all control channel candidates at each first aggregation level in the aggregation levels supported by both the localized transmission mode and the distributed transmission mode to at least one of the $K_L$ sets; and allocating at least one half of all control channel candidates at each second aggregation level in the aggregation levels supported by both the localized transmission mode and the distributed transmission mode to at least one of the $K_D$ sets.

Herein, when the aggregation levels supported by both the localized transmission mode and the distributed transmission mode are 1, 2, 4, and 8, the first aggregation levels are 1 and 2, and the second aggregation levels are 4 and 8; and when the aggregation levels supported by both the localized transmission mode and the distributed transmission mode are 2, 4, 8, and 16, the first aggregation levels are 2 and 4, and the second aggregation levels are 8 and 16. Remaining control channel candidates at each aggregation level are allocated to different sets according to a predefined sequence of control channel sets and/or a position of a start set at the aggregation level. The position of a start set at each aggregation level is related to the number of control channel candidates at the aggregation level and configuration of $K_L$ and $K_D$.

Optionally, when the number of control channel candidates at the aggregation level is 2, remaining control channel candidates are not placed in any set corresponding to a transmission mode of a first control channel candidate.

The processor 34 being configured to allocate all control channel candidates at an aggregation level supported by only the distributed transmission mode or the localized transmission mode to at least one set in the $K_D$ sets of the distributed transmission mode or in the $K_L$ sets of the localized transmission mode, includes: determining, according to the number of sets used for the aggregation level in $K_D$ or $K_L$, the number of control channel candidates allocated to each set in the $K_D$ or $K_L$ sets, at the aggregation level; or determining, according to a ratio of the number of physical resource blocks of each set in sets used for the aggregation level in $K_D$ or $K_L$, the number of control channel candidates allocated to each set in the $K_D$ or $K_L$ sets, at the aggregation level.

The processor 34 being configured to allocate all control channel candidates at each aggregation level in the aggregation levels supported by both the localized transmission mode and the distributed transmission mode to at least one of the $K_D$ sets and at least one of the $K_L$ sets when both $K_L$ and $K_D$ are positive integers, includes: determining, according to a ratio between the numbers of sets used for the aggregation level in $K_D$ and $K_L$, the numbers of control channel candidates allocated to the $K_L$ and $K_D$ sets, at each aggregation level; or determining, according to a ratio between the total numbers of physical resource blocks in sets used for the aggregation level in $K_D$ and $K_L$, the numbers of control channel candidates allocated to the $K_L$ and $K_D$ sets, at each aggregation level; or determining, according to a ratio of the number of physical resource blocks of each set in sets used for the aggregation level in $K_D$ and $K_L$, the number of control channel candidates allocated to each set in the $K_L$ and $K_D$ sets, at each aggregation level.

At each aggregation level, the numbers of control channel candidates allocated to the $K_L$ and $K_D$ sets are configured. The configuration is a higher-layer semi-static configuration.

At each aggregation level, when the number of control channel candidates configured for the $K_L$ (greater than 1) sets is greater than 1, the processor 34 is configured to determine the number of control channel candidates in each set according to the number of physical resource blocks included in each set that can support the aggregation level in the $K_L$ sets or the number of sets that can support the aggregation level in the $K_L$ sets, or when the number of control channel candidates configured for the $K_D$ (greater than 1) sets is greater than 1, the processor 34 is configured to determine the number of control channel candidates in each set according to the number of physical resource blocks included in each set that can support the aggregation level in the $K_D$ sets or the number of sets that can support the aggregation level in the $K_D$ sets.

At each aggregation level supported by the control channel to be transmitted, the number of control channel candidates allocated to the $K_L$ sets of the localized transmission mode and the number of control channel candidates allocated to the $K_D$ sets of the distributed transmission mode are functions of at least one of the number of control channel candidates at the aggregation level, the number $K_L$ of sets of the localized transmission mode, and the number $K_D$ of sets of the distributed transmission mode.

When the number of control channel candidates corresponding to the aggregation levels supported by both the localized transmission mode and the distributed transmission mode is an even number, the number of control channel candidates allocated to the $K_L$ sets of the localized transmission mode meets the following formula:

$$M^{(L)}/2 + \left\lfloor \frac{K_L}{K_L + K_D} \cdot M^{(L)}/2 \right\rfloor;$$

and the number of control channel candidates allocated to the $K_D$ sets of the distributed transmission mode meets the following formula:

$$M^{(L)}/2 - \left\lfloor \frac{K_L}{K_L + K_D} \cdot M^{(L)}/2 \right\rfloor.$$

When the number of control channel candidates corresponding to the lower aggregation levels is an odd number, the number of control channel candidates allocated to the $K_L$ sets of the localized transmission mode meets the following formula:

$$(M^{(L)} + 1)/2 + \left\lfloor \frac{K_L}{K_L + K_D} \cdot (M^{(L)} - 1)/2 \right\rfloor;$$

and the number of control channel candidates allocated to the $K_D$ sets of the distributed transmission mode meets the following formula:

$$(M^{(L)} - 1)/2 - \left\lfloor \frac{K_L}{K_L + K_D} \cdot (M^{(L)} - 1)/2 \right\rfloor.$$

An allocation ratio of all candidates at aggregation levels where the number of control channel candidates is 2, is 1:1 between the $K_L$ sets of the localized transmission mode and the $K_D$ sets of the distributed transmission mode.

The processor 34 is configured to determine that at least one set in the K sets for transmitting the control channel is used to allocate control channel candidates at one or two aggregation levels.

A rule for determining aggregation levels that can be supported by the control channel to be transmitted includes: when the total number of aggregation levels that can be supported by the control channel is N, obtaining, according to the number of valid physical resource elements included in each physical resource block pair, k (k<=N) aggregation levels in the N aggregation levels as aggregation levels of the control channel to be transmitted, or configuring, semi-statically through RRC signaling, k (k<=N) aggregation levels in the N aggregation levels as aggregation levels that can be supported by the control channel to be transmitted.

A form of semi-static configuration through RRC signaling is a bitmap.

If the number of aggregation levels of the control channel to be transmitted is N, the numbers of control channel candidates corresponding to any p (p<=4) aggregation levels in 4 aggregation levels (1, 2, 4, 8) in an original protocol are respectively configured for corresponding aggregation levels in the N aggregation levels of the control channel to be transmitted, and the numbers of control channel candidates corresponding to remaining (4-p) aggregation levels in the 4 aggregation levels (1, 2, 4, 8) in the original protocol are correspondingly configured for remaining N-p aggregation levels in the N aggregation levels of the control channel to be transmitted.

Optionally, the apparatus includes a detecting unit. When the aggregation levels supported by the control channel to be transmitted include 32, and the number of available resource elements in each physical resource block pair except resource elements of other signals, such as a CRS, a DMRS, a CSI-RS, a PDCCH, is greater than or equal to 72, the detecting unit does not detect control channel candidates at aggregation level 32; otherwise, the detecting unit detects the control channel candidates at aggregation level 32; or, when the aggregation levels supported by the control channel to be transmitted do not include 32, and the number of available resource elements in each physical resource block pair except resource elements of other signals, such as a CRS, a DMRS, a CSI-RS, a PDCCH, is less than 72, the detecting unit detects control channel candidates at aggregation level 8.

When the control channel to be transmitted is transmitted with an extended cyclic prefix, and the supported aggregation levels include 16, and the number of available resource elements in each physical resource block pair except resource elements of other signals, such as a CRS, a DMRS, a CSI-RS, a PDCCH, is greater than or equal to 72, the detecting unit does not detect control channel candidates at aggregation level 16; otherwise, the detecting unit detects the control channel candidates at aggregation level 16; or, when the control channel to be transmitted is transmitted with an extended cyclic prefix, and the supported aggregation levels do not include 16, and the number of available resource elements in each physical resource block pair except resource elements of other signals, such as a CRS, a DMRS, a CSI-RS, a PDCCH, is less than 72, the detecting unit detects PDCCH candidates at aggregation level 8.

The $K_L$ and $K_D$ for transmitting the control channel are configured, and the number of physical resource block pairs included in each set is configured; or the $K_L$ and $K_D$ for transmitting the control channel are fixed, the number of physical resource block pairs included in each set is configured, and allocation of all control channel candidates at each aggregation level to the $K_L$ and $K_D$ sets is fixed.

Herein the configuration refers to parameters configured by the base station for the UE through higher-layer signaling, which means, values of the $K_L$ and $K_D$ and the number of physical resource block pairs included in each set may all be configured by the base station for the UE.

In the method and apparatus for allocating control channel candidates according to the embodiments of the present application, K sets for transmitting a control channel are determined, and control channel candidates at each aggregation level are allocated to at least one set in the K sets according to at least one of aggregation levels supported by the control channel to be transmitted, the number of control channel candidates corresponding to each aggregation level, the K sets for transmitting the control channel, and types of the sets. Therefore, control channel candidates at different aggregation levels can be allocated to K ePDCCH sets, and a search space of a UE is defined, thereby reducing complexity of blind detection performed by the UE.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for detecting a control channel, the method comprising:
    obtaining, by user equipment (UE), K sets configured for transmitting a control channel, wherein each of the K sets comprises at least one physical resource block pair, and K is an integer greater than 0;
    detecting, by the UE, control channel candidates on at least one set of the K sets according to aggregation levels supported by the control channel, quantities of control channel candidates of the aggregation levels, the K sets configured for transmitting the control channel, and types of the K sets;
    wherein the types of the K sets comprise one or both of a localized transmission mode and a distributed transmission mode, and a quantity of sets of the localized transmission mode is $K_L$, and a quantity of sets of the distributed transmission mode is $K_D$, $K_L+K_D=K$, wherein $K_L$ and $K_D$ are integers greater than or equal to 0; and
    the aggregation levels supported by the control channel comprise one or more of the following levels:
        an aggregation level supported by the localized transmission mode, an aggregation level supported by the distributed transmission mode, and an aggregation level supported by both the localized transmission mode and the distributed transmission mode.

2. The method according to claim 1, wherein the UE detects the control channel candidates according to the following control channel candidate allocation:
    when $K_L$ is a positive integer and $K_D$=0, all control channel candidates at the aggregation level supported by the localized transmission mode are allocated to at least one of the $K_L$ sets; or
    when $K_D$ is a positive integer and $K_L$=0, all control channel candidates at the aggregation level supported by the distributed transmission mode are allocated to at least one of the $K_D$ sets; or
    when both $K_L$ and $K_D$ are positive integers, all control channel candidates at the aggregation level supported by both the localized transmission mode and the distributed transmission mode are allocated to at least one of the $K_L$ sets and at least one of the $K_D$ sets.

3. The method according to claim 2, wherein the aggregation level supported by both the localized transmission mode and the distributed transmission mode comprises a first aggregation level and a second aggregation level, and wherein:

at least one half of all control channel candidates at the first aggregation level supported by both the localized transmission mode and the distributed transmission mode are allocated to at least one of the $K_L$ sets; and at least one half of all control channel candidates at the second aggregation level supported by both the localized transmission mode and the distributed transmission mode are allocated to at least one of the $K_D$ sets.

4. The method according to claim 3, wherein when the aggregation level supported by both the localized transmission mode and the distributed transmission mode comprises aggregation level 1, aggregation level 2, aggregation level 4, and aggregation level 8, the first aggregation level comprises aggregation level 1 and aggregation level 2, and the second aggregation level comprises aggregation level 4 and aggregation level 8.

5. The method according to claim 3, wherein when the aggregation level supported by both the localized transmission mode and the distributed transmission mode comprises aggregation level 2, aggregation level 4, aggregation level 8, and aggregation level 16, the first aggregation level comprises aggregation level 2 and aggregation level 4, and the second aggregation level comprises aggregation level 8 and aggregation level 16.

6. The method according to claim 2, wherein when both $K_L$ and $K_D$ are positive integers, all control channel candidates at the aggregation level supported by both the localized transmission mode and the distributed transmission mode are allocated to at least one of the $K_L$ sets and at least one of the $K_D$ sets, wherein:

quantities of control channel candidates allocated to the $K_L$ sets and the $K_D$ sets are determined according to a ratio between quantities of sets used for the aggregation level in the $K_D$ sets and the $K_L$ sets; or quantities of control channel candidates allocated to the $K_L$ sets and the $K_D$ sets are determined according to a ratio between total quantities of physical resource blocks in sets used for the aggregation level in the $K_D$ sets and the $K_L$ sets; or a quantity of control channel candidates allocated to each of the $K_L$ sets and the $K_D$ sets is determined according to a ratio of a quantity of physical resource blocks of each set in sets used for the aggregation level in the $K_D$ sets and the $K_L$ sets.

7. The method according to claim 2, wherein when $K_L$ is a positive integer and $K_D$=0, or $K_D$ is a positive integer and $K_L$=0:

a quantity of control channel candidates allocated to each set in the $K_D$ sets or $K_L$ sets is determined according to a quantity of sets used for the aggregation level in $K_D$ or $K_L$ sets; or a quantity of control channel candidates allocated to each set in the $K_D$ sets or $K_L$ sets is determined according to a ratio of a quantity of physical resource blocks of each set in sets used for the aggregation level in $K_D$ or $K_L$ sets.

8. The method according to claim 2, wherein:

at an aggregation level, when a quantity of control channel candidates configured for the $K_L$ sets is greater than 1, a quantity of control channel candidates in each set is determined according to a quantity of physical resource blocks comprised in each set that can support the aggregation level in the $K_L$ sets or a quantity of sets that can support the aggregation level in the $K_L$ sets, wherein $K_L$ is greater than 1; or at an aggregation level, when a quantity of control channel candidates configured for the $K_D$ sets is greater than 1, a quantity of control channel candidates in each set is determined according to a quantity of physical resource blocks comprised in each set that can support the aggregation level in the $K_D$ sets or a quantity of sets that can support the aggregation level in the $K_D$ sets, wherein $K_D$ is greater than 1.

9. An apparatus for detecting a control channel, the apparatus comprising:

a processor; and a non-transitory computer readable storage medium, wherein the non-transitory computer readable storage medium stores a program that, when executed by the processor, causes the apparatus to:

obtain K sets configured for transmitting a control channel, wherein each of the K sets comprises at least one physical resource block pair, and K is an integer greater than 0, and detect control channel candidates on at least one set of the K sets according to aggregation levels supported by the control channel, quantities of control channel candidates of the aggregation levels, the K sets configured for transmitting the control channel, and types of the K sets;

wherein the types of the K sets comprise one or both of a localized transmission mode and a distributed transmission mode, and a quantity of sets of the localized transmission mode is $K_L$, and a quantity of sets of the distributed transmission mode is $K_D$, $K_L+K_D=K$, wherein $K_L$ and $K_D$ are integers greater than or equal to 0; and the aggregation levels supported by the control channel comprise one or more of the following levels:

an aggregation level supported by the localized transmission mode, an aggregation level supported by the distributed transmission mode, and an aggregation level supported by both the localized transmission mode and the distributed transmission mode.

10. The apparatus according to claim 9, wherein the control channel candidates are detected according to the following control channel candidate allocation:

when $K_L$ is a positive integer and $K_D$=0, all control channel candidates at the aggregation level supported by the localized transmission mode are allocated to at least one of the $K_L$ sets; or when $K_D$ is a positive integer and $K_L$=0, all control channel candidates at the aggregation level supported by the distributed transmission mode are allocated to at least one of the $K_D$ sets; or when both $K_L$ and $K_D$ are positive integers, all control channel candidates at the aggregation level supported by both the localized transmission mode and the distributed transmission mode are allocated to at least one of the $K_L$ sets and at least one of the $K_D$ sets.

11. The apparatus according to claim 10, wherein the aggregation level supported by both the localized transmission mode and the distributed transmission mode comprises a first aggregation level and a second aggregation level, and wherein:

at least one half of all control channel candidates at the first aggregation level supported by both the localized transmission mode and the distributed transmission mode are allocated to at least one of the $K_L$ sets; and at least one half of all control channel candidates at the second aggregation level supported by both the localized transmission mode and the distributed transmission mode are allocated to at least one of the $K_D$ sets.

12. The apparatus according to claim 11, wherein when the aggregation level supported by both the localized transmission mode and the distributed transmission mode comprises aggregation level 1, aggregation level 2, aggregation level 4, and aggregation level 8, the first aggregation level comprises aggregation level 1 and aggregation level 2, and the second aggregation level comprises aggregation level 4 and aggregation level 8.

13. The apparatus according to claim 11, wherein when the aggregation level supported by both the localized transmission mode and the distributed transmission mode comprises aggregation level 2, aggregation level 4, aggregation level 8, and aggregation level 16, the first aggregation level comprises aggregation level 2 and aggregation level 4, and the second aggregation level comprises aggregation level 8 and aggregation level 16.

14. The apparatus according to claim 10, wherein when both $K_L$ and $K_D$ are positive integers, all control channel candidates at the aggregation level supported by both the localized transmission mode and the distributed transmission mode are allocated to at least one of the $K_L$ sets and at least one of the $K_D$ sets, wherein
quantities of control channel candidates allocated to the $K_L$ sets and the $K_D$ sets are determined according to a ratio between quantities of sets used for the aggregation level in the $K_D$ sets and the $K_L$ sets; or
quantities of control channel candidates allocated to the $K_L$ sets and the $K_D$ sets are determined according to a ratio between total quantities of physical resource blocks in sets used for the aggregation level in the $K_D$ sets and the $K_L$ sets; or
a quantity of control channel candidates allocated to each of the $K_L$ sets and the $K_D$ sets is determined according to a ratio of a quantity of physical resource blocks of each set in sets used for the aggregation level in the $K_D$ sets and the $K_L$ sets.

15. The apparatus according to claim 10, wherein when $K_L$ is a positive integer and $K_D=0$, or $K_D$ is a positive integer and $K_L=0$:
a quantity of control channel candidates allocated to each set in the $K_D$ sets or $K_L$ sets is determined according to a quantity of sets used for the aggregation level in $K_D$ or $K_L$ sets; or
a quantity of control channel candidates allocated to each set in the $K_D$ sets or $K_L$ sets is determined according to a ratio of a quantity of physical resource blocks of each set in sets used for the aggregation level in $K_D$ or $K_L$ sets.

16. The apparatus according to claim 10, wherein:
at an aggregation level, when a quantity of control channel candidates configured for the $K_L$ sets is greater than 1, a quantity of control channel candidates in each set is determined according to a quantity of physical resource blocks comprised in each set that can support the aggregation level in the $K_L$ sets or a quantity of sets that can support the aggregation level in the $K_L$ sets, wherein $K_L$ is greater than 1; or
at an aggregation level, when a quantity of control channel candidates configured for the $K_D$ sets is greater than 1, a quantity of control channel candidates in each set is determined according to a quantity of physical resource blocks comprised in each set that can support the aggregation level in the $K_D$ sets or a quantity of sets that can support the aggregation level in the $K_D$ sets, wherein $K_D$ is greater than 1.

17. A non-transitory computer readable storage medium comprising instructions that, when executed by a processor, cause the processor to:
obtain K sets configured for transmitting a control channel, wherein each of the K sets comprises at least one physical resource block pair, and K is an integer greater than 0;
detect control channel candidates on at least one set of the K sets according to aggregation levels supported by the control channel, quantities of control channel candidates of the aggregation levels, the K sets configured for transmitting the control channel, and types of the K sets;
wherein the types of the K sets comprise one or both of a localized transmission mode and a distributed transmission mode, and a quantity of sets of the localized transmission mode is $K_L$, and a quantity of sets of the distributed transmission mode is $K_D$, $K_L K_D=K$, wherein $K_L$ and $K_D$ are integers greater than or equal to 0; and
the aggregation levels supported by the control channel comprise one or more of the following levels:
an aggregation level supported by the localized transmission mode, an aggregation level supported by the distributed transmission mode, and an aggregation level supported by both the localized transmission mode and the distributed transmission mode.

18. The non-transitory computer readable storage medium according to claim 17, wherein execution of the instructions further causes the processor to detect the control channel candidates according to the following control channel candidate allocation:
when $K_L$ is a positive integer and $K_D=0$, all control channel candidates at the aggregation level supported by the localized transmission mode are allocated to at least one of the $K_L$ sets; or
when $K_D$ is a positive integer and $K_L=0$, all control channel candidates at the aggregation level supported by the distributed transmission mode are allocated to at least one of the $K_D$ sets; or
when both $K_L$ and $K_D$ are positive integers, all control channel candidates at the aggregation level supported by both the localized transmission mode and the distributed transmission mode are allocated to at least one of the $K_L$ sets and at least one of the $K_D$ sets.

* * * * *